US009686786B2

(12) United States Patent
Lee et al.

(10) Patent No.: US 9,686,786 B2
(45) Date of Patent: Jun. 20, 2017

(54) METHOD FOR UPDATING BASE STATION INFORMATION IN CONVERGED NETWORK SUPPORTING MULTIPLE COMMUNICATION SYSTEMS, AND DEVICE THEREFOR

(71) Applicant: LG ELECTRONICS INC., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/655,324

(22) PCT Filed: Jan. 7, 2014

(86) PCT No.: PCT/KR2014/000132
§ 371 (c)(1),
(2) Date: Jun. 24, 2015

(87) PCT Pub. No.: WO2014/109521
PCT Pub. Date: Jul. 17, 2014

(65) Prior Publication Data
US 2015/0341926 A1    Nov. 26, 2015

Related U.S. Application Data

(60) Provisional application No. 61/751,237, filed on Jan. 10, 2013, provisional application No. 61/752,461, (Continued)

(51) Int. Cl.
*H04W 72/04* (2009.01)
*H04W 76/02* (2009.01)
(Continued)

(52) U.S. Cl.
CPC ....... *H04W 72/0426* (2013.01); *H04W 48/10* (2013.01); *H04W 48/12* (2013.01); (Continued)

(58) Field of Classification Search
CPC ................................. H04W 72/0426
See application file for complete search history.

(56) References Cited

U.S. PATENT DOCUMENTS

| 9,185,613 B2 | 11/2015 | Dinan |
| 2005/0153692 A1 | 7/2005 | Hwang et al. |

(Continued)

FOREIGN PATENT DOCUMENTS

| GB | 2486360 | 6/2012 |
| KR | 10-2009-0035457 | 4/2009 |

(Continued)

OTHER PUBLICATIONS

PCT International Application No. PCT/KR2014/000132, Written Opinion of the International Searching Authority dated Apr. 28, 2014, 16 pages.

(Continued)

*Primary Examiner* — John Blanton
(74) *Attorney, Agent, or Firm* — Lee Hong Degerman Kang Waimey

(57) ABSTRACT

This method whereby a base station in a first communication system updates base station information in a converged network supporting multiple communication systems may comprise the steps of: receiving a first message including changed information from a base station in a second communication system if information from and related to the base station in the second communication system has changed or if information related to the base station in the first communication system has changed; and updating with the changed information on the basis of the first message.

10 Claims, 21 Drawing Sheets

Related U.S. Application Data filed on Jan. 15, 2013, provisional application No. 61/760,174, filed on Feb. 4, 2013, provisional application No. 61/760,176, filed on Feb. 4, 2013, provisional application No. 61/761,662, filed on Feb. 6, 2013.

(51) Int. Cl.
| | | |
|---|---|---|
| *H04W 60/00* | (2009.01) | |
| *H04W 48/10* | (2009.01) | |
| *H04W 84/12* | (2009.01) | |
| *H04W 56/00* | (2009.01) | |
| *H04W 84/04* | (2009.01) | |
| *H04W 48/12* | (2009.01) | |
| *H04W 88/10* | (2009.01) | |
| *H04W 88/00* | (2009.01) | |

(52) U.S. Cl.
CPC ....... *H04W 56/002* (2013.01); *H04W 60/005* (2013.01); *H04W 76/026* (2013.01); *H04W 84/042* (2013.01); *H04W 84/12* (2013.01); *H04W 88/005* (2013.01); *H04W 88/10* (2013.01)

(56) References Cited

U.S. PATENT DOCUMENTS

| 2008/0051087 | A1* | 2/2008 | Ryu ................... H04W 36/12 455/436 |
| 2009/0196254 | A1* | 8/2009 | Cha .................... H04W 36/30 370/331 |
| 2010/0260156 | A1 | 10/2010 | Lee et al. |
| 2011/0228687 | A1* | 9/2011 | Catovic ............ H04W 36/0083 370/252 |
| 2011/0299446 | A1* | 12/2011 | Chun .................... H04W 36/04 370/311 |
| 2012/0063410 | A1* | 3/2012 | Hong ................ H04W 72/085 370/330 |
| 2012/0213123 | A1 | 8/2012 | Futaki |
| 2012/0302243 | A1 | 11/2012 | Park et al. |

FOREIGN PATENT DOCUMENTS

| KR | 1020090088536 | 8/2009 |
| KR | 10-2010-0003664 | 1/2010 |
| KR | 100952708 | 4/2010 |
| KR | 10-2011-0067820 | 6/2011 |
| KR | 101092822 | 12/2011 |
| KR | 10-2012-0077397 | 7/2012 |
| KR | 1020120079875 | 7/2012 |

OTHER PUBLICATIONS

PCT International Application No. PCT/KR2014/000132, Written Opinion of the International Searching Authority dated Apr. 28, 2014, 12 pages.

PCT International Application No. PCT/KR2014/000133, Written Opinion of the International Searching Authority dated May 29, 2014, 26 pages.

European Patent Office Application Serial No. 14738174.3, Search Report dated Jul. 4, 2016, 11 pages.

U.S. Appl. No. 14/758,387, Office Action dated Sep. 26, 2016, 10 pages.

* cited by examiner

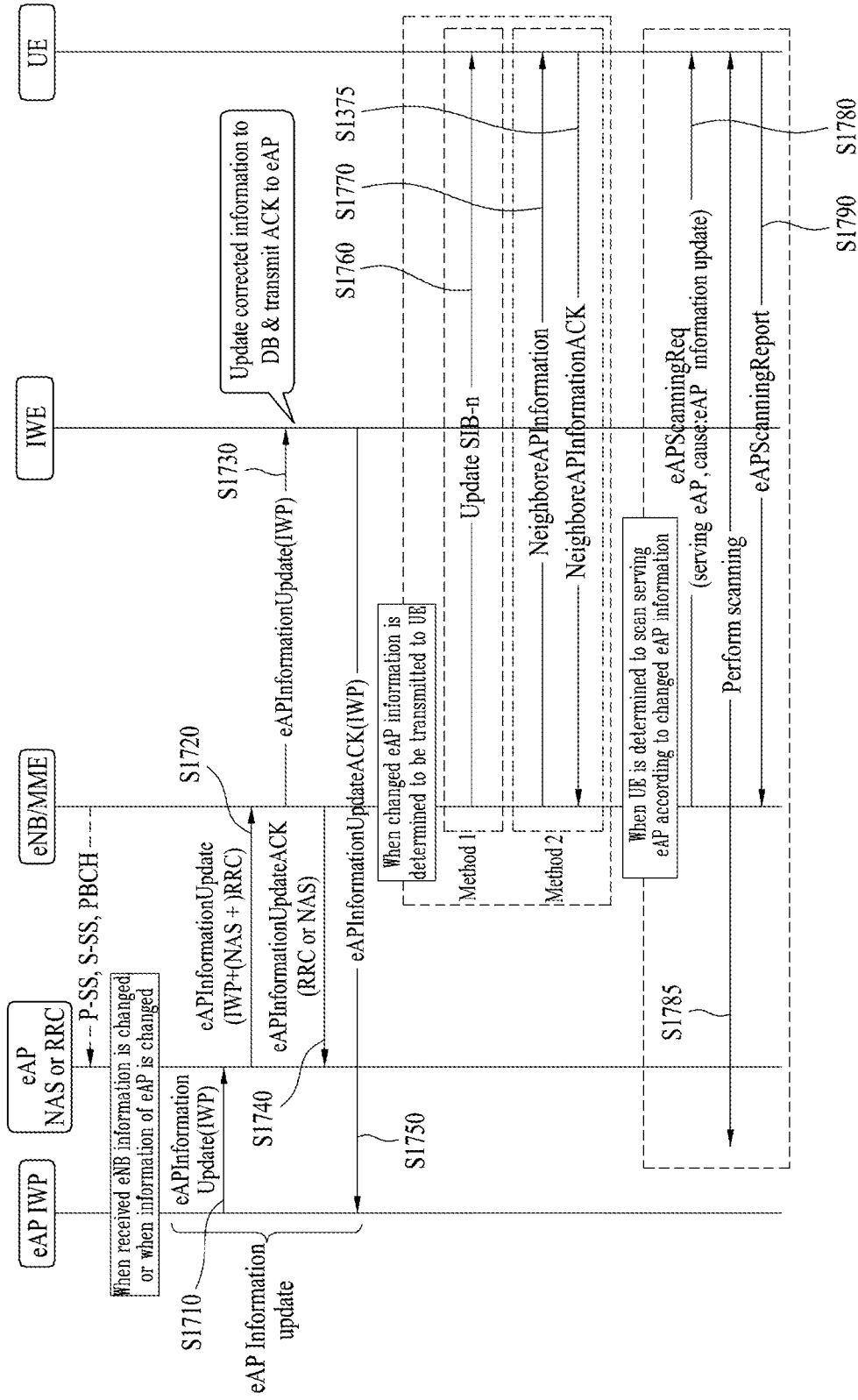

METHOD FOR UPDATING BASE STATION INFORMATION IN CONVERGED NETWORK SUPPORTING MULTIPLE COMMUNICATION SYSTEMS, AND DEVICE THEREFOR

CROSS-REFERENCE TO RELATED APPLICATIONS

This application is the National Stage filing under 35 U.S.C. 371 of International Application No. PCT/KR2014/000132, filed on Jan. 7, 2014, which claims the benefit of U.S. Provisional Application Nos. 61/751,237, filed on Jan. 10, 2013, 61/752,461, filed on Jan. 15, 2013, 61/760,174, filed on Feb. 4, 2013, 61/760,176, filed on Feb. 4, 2013 and 61/761,662, filed on Feb. 6, 2013, the contents of which are all hereby incorporated by reference herein in their entirety.

TECHNICAL FIELD

The present invention relates to wireless communication, and more particularly, a method and apparatus for updating base station information in converged network for supporting multiple communication systems.

BACKGROUND ART

In a wireless communication system, there may be multi-RAT user equipment (UE) with capability for access to two or more radio access technologies (RATs). In order to access specific RAT, connection is established to specific RAT and data is transmitted and received based on UE request.

However, even if the multi-RAT UE has capability of accessing two or more RATs, the multi-RAT UE cannot simultaneously access multiple RATs. That is, currently, even if a UE has multi-RAT capability, the UE cannot simultaneously transmit and receive data through different RATs.

Such conventional multi-RAT technology does not require interworking between a wireless LAN and a cellular network, there is a problem in terms of overall low system efficiency. In addition, research has not been conducted to overcome the problem.

DISCLOSURE

Technical Problem

An object of the present invention devised to solve the problem lies in a method for updating base station information by a base station of a first communication system in a converged network for supporting multiple communication systems.

Another object of the present invention devised to solve the problem lies in a method for updating base station information by user equipment in a converged network for supporting multiple communication systems.

Another object of the present invention devised to solve the problem lies in a base station of a first communication system for updating base station information in a converged network for supporting multiple communication systems.

Another object of the present invention devised to solve the problem lies in user equipment for updating base station information in a converged network for supporting multiple communication systems.

It is to be understood that both the foregoing general description and the following detailed description of the present invention are exemplary and explanatory and are intended to provide further explanation of the invention as claimed.

Technical Solution

The object of the present invention can be achieved by providing a method for updating base station information by a base station of a first communication system in a converged network for supporting a plurality of communication systems, the method including, when information associated with a base station of a second communication system is changed or information associated with the base station of the first communication system is changed, receiving a first message including the changed information, from the base station of the second communication system, and updating the changed information based on the first message. When the information associated with the base station of the second communication system is changed, the first message may include at least a changed identifier (ID) of the base station of the second communication system, a changed center frequency channel number, a changed bandwidth, a changed cell ID, changed location information, changed load status information, changed interference information between the base station of the second communication system and a neighbor access point (AP), or scanning result information of the neighbor AP. When the information associated with the base station of the first communication system is changed, the first message may include at least changed uplink timing synchronization information of the base station of the first communication system, a changed timing advance measurement value, or a changed reference signal intensity measurement value. A case in which the information associated with the base station of the first communication system is changed may include a case in which the base station of the first communication system is changed to another base station of the first communication system, and the first message may include information of another base station of the first communication system. The method may further include transmitting the updated information to a user equipment. The method may further include, when a user equipment needs to scan the base station of the second communication system according to the updated information, transmitting a scanning request message to the user equipment. The scanning request message may include a reason for the scanning request and information about the base station of the second communication system to be scanned. The reason for the scanning request included in the scanning request message may indicate that the information of the base station of the second communication system is updated. The method may further include receiving a scanning result report for the base station of the second communication system from the user equipment. The first communication system may be a cellular communication system and the second communication system may be a wireless LAN system.

In another aspect of the present invention, provided herein is a method for updating base station information by a user equipment in a converged network for supporting multiple communication systems, the method including, when information associated with a base station of a second communication system is changed, receiving a first message including the changed information associated with the base station of the second communication system, from a base station of a first communication system, and updating the information associated with the base station of the second communication system based on the first message. The first message may include at least a changed identifier (ID) of the base station of the second communication system, a changed center frequency channel number, a changed bandwidth, a changed cell ID, changed location information, load status information, changed interference information between the base station of the second communication system and a neighbor access point (AP), or scanning result information of the neighbor AP. The method may further include receiving a scanning request message for requesting scanning of the base stations of the second communication system from the base station of the first communication system. The method may further include scanning the base stations of the second communication system based on the scanning request message, and transmitting a result of the scanning to the base station of the first communication system. The first communication system is a cellular communication system and the second communication system is a wireless LAN system.

In another aspect of the present invention, provided herein is a base station of a first communication system for updating base station information in a converged network for supporting multiple communication systems, the base station including a receiver configured to, when information associated with a base station of a second communication system is changed or information associated with the base station of the first communication system is changed, receive a first message including the changed information, from the base station of the second communication system, and a processor configured to update the changed information based on the first message, wherein the first communication system is a cellular communication system and the second communication system is a wireless LAN system.

In another aspect of the present invention, provided herein is a user equipment for updating base station information in a converged network for supporting multiple communication systems, the user equipment including a receiver configured to, when information associated with a base station of a second communication system, receive a first message including information associated with the base station of the second communication, from a base station of a first communication system, and a processor configured to update the information associated with the base station of the second communication system based on the first message, wherein the first communication system is a cellular communication system and the second communication system is a wireless LAN system.

Advantageous Effects

When a cellular network proposed according to the present invention controls information of AP, it is advantageous that user equipment can effectively use WLAN via control of a cellular network in a broadband wireless communication system using a method for effectively updating AP information by an AP information control entity, an eNB or a UE.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 17 is another diagram for explanation of a procedure for updating AP information when an AP information control entity is an IWE.

BEST MODE

Figure 1:
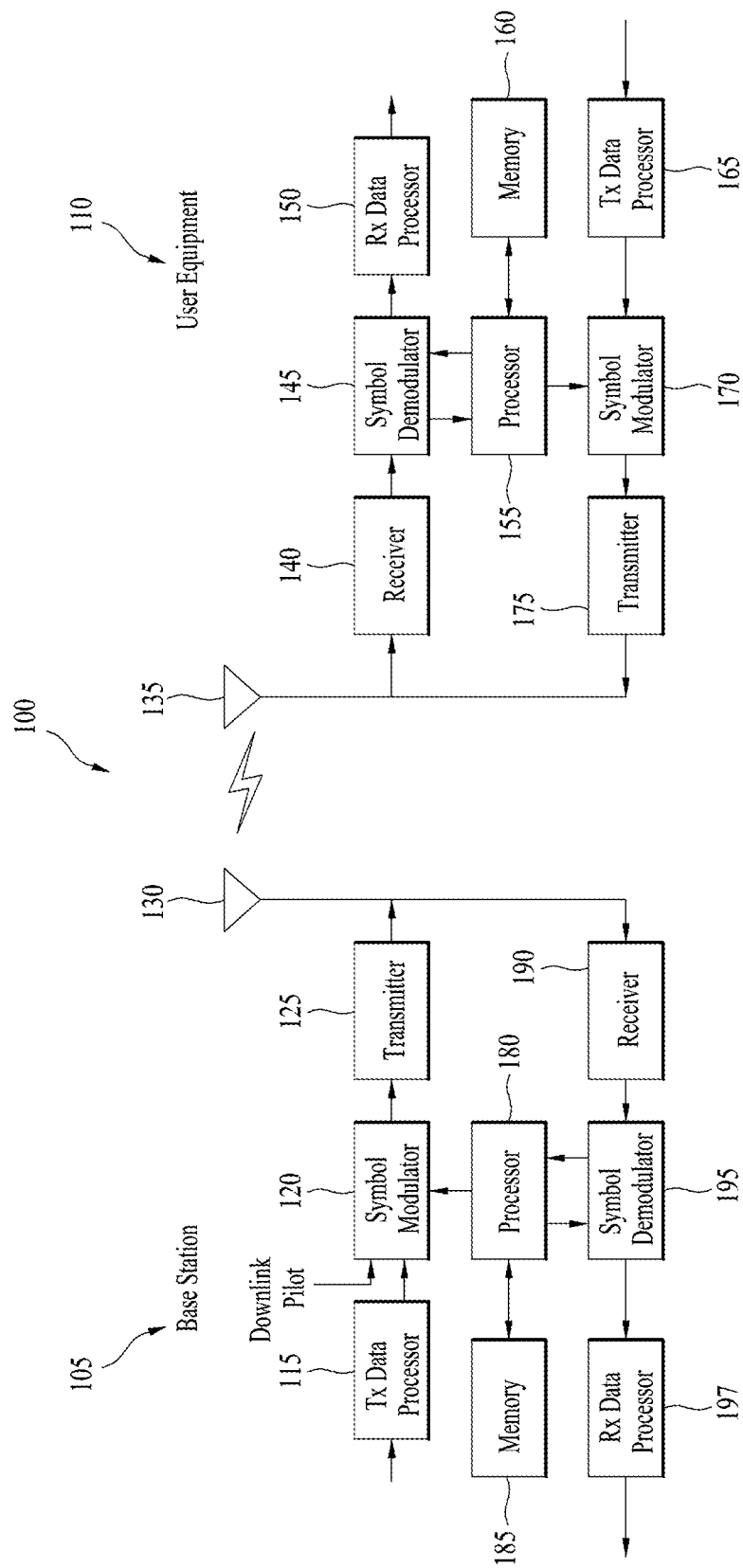
FIG. 1 is a block diagram for configurations of a base station and a user equipment in a wireless communication system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
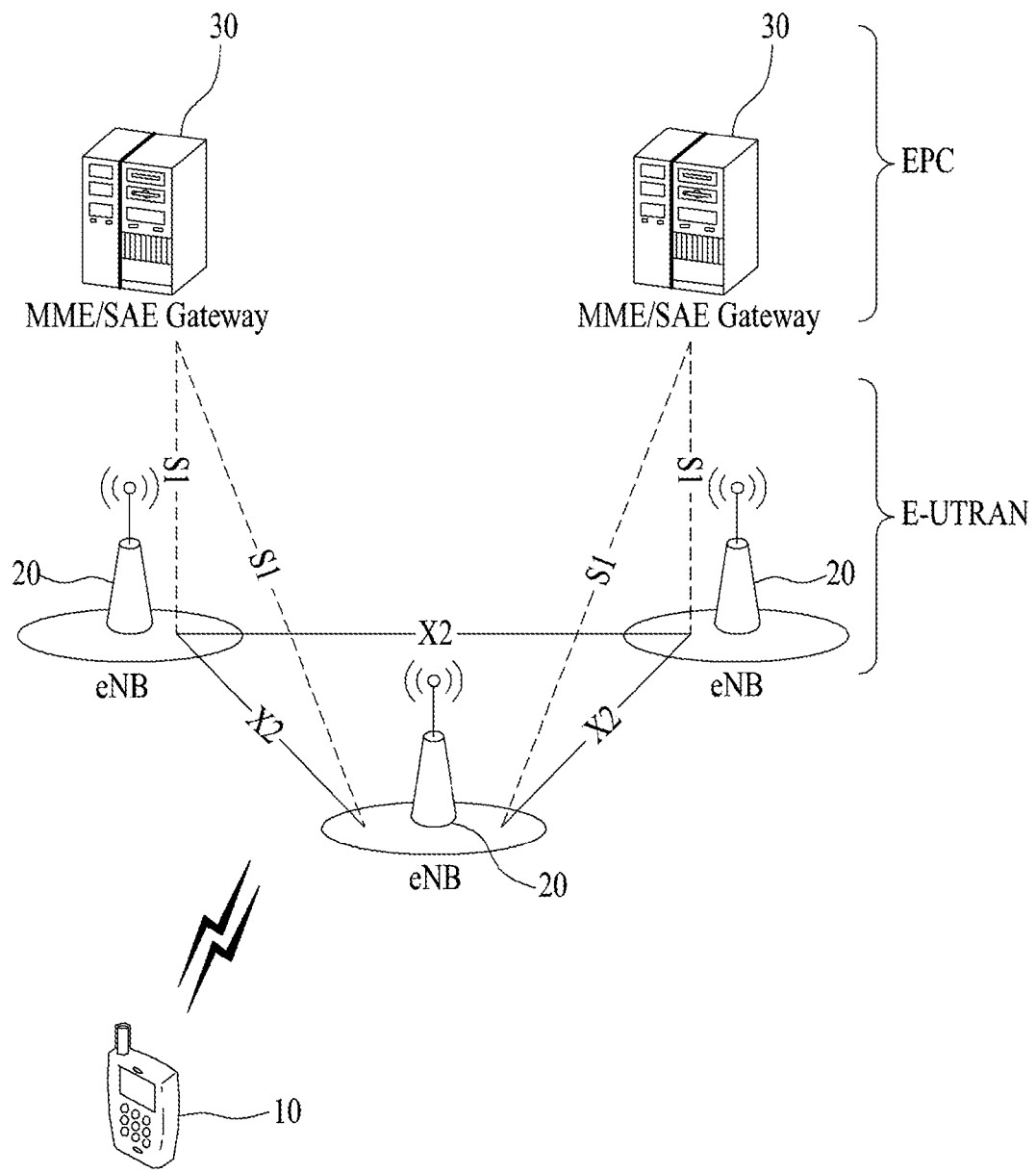
FIG. 2 is a diagram illustrating a structure of a network of an evolved universal mobile telecommunications system (E-UMTS)

FIG. 2 is a diagram illustrating a structure of a network of an evolved universal mobile telecommunications system (E-UMTS). The E-UMTS may also be referred to as an LTE system. The system may be broadly arranged in order to provide various communication services such as voice ALV packet data and in general, may be configured to be enabled based on various technologies that will be described and disclosed in detail with reference to the following diagrams.

Referring to FIG. 2, the E-UMTS network includes an evolved UMTS terrestrial radio access network (E-UTRAN), an evolved packet core (EPC), and one or more UEs 10. The E-UTRAN includes one or more BSs 20. With regard to the EPC, an MME/SAE gateway 30 provides an end point of a session and a mobility control function to the UE 10. The BS 20 and the MME/SAE gateway 30 may be connected through an S1 interface.

The UE 10 may be an apparatus brought by a user and may also be referred to as a mobile station (MS), a user terminal (UT), a subscriber station (SS), or a wireless apparatus.

In general, the BS 20 is a fixed station that communicates with the UE 10. The BS 20 may also be referred to as an access point (AP) as well as a base station. A BS provides end points of a user plane and a control plane to a UE. In general, the BS is configured to include a transmitter and a processor among other components and to be operated according to various technologies stated in the specification.

A plurality of UEs 10 may be positioned in one cell. In general, one BS 20 is arranged in each cell. An interface for transmission of user traffic or control traffic may be used between the BSs 20. In this specification, "downlink" refers to communication to the UE 10 from the BS 20 and "uplink" refers to communication to the BS 20 from the UE 10.

The MME/SAE gateway 30 provides various functions including distribution of paging messages, security control, idle state mobility control, SAR bearer control, and ciphering and integrity protection of non-access stratum (NAS) signaling to the BSs 20. The SAE gateway 30 provides various functions including termination of U-plan packets for paging reasons and switching of U-plan for supporting UE mobility. For convenience of description, the MME/SAE gateway 30 may also be referred to as a "gateway" in the specification. However, this structure may be interpreted as including both an MME gateway and a SAE gateway.

A plurality of nodes may be connected between the BS 20 and the gateway 30 through an S1 interface. The BSs 20 may be connected to each other through an X2 interface and neighbor BSs may have a meshed network structure with an X2 interface.

Figure 3A:
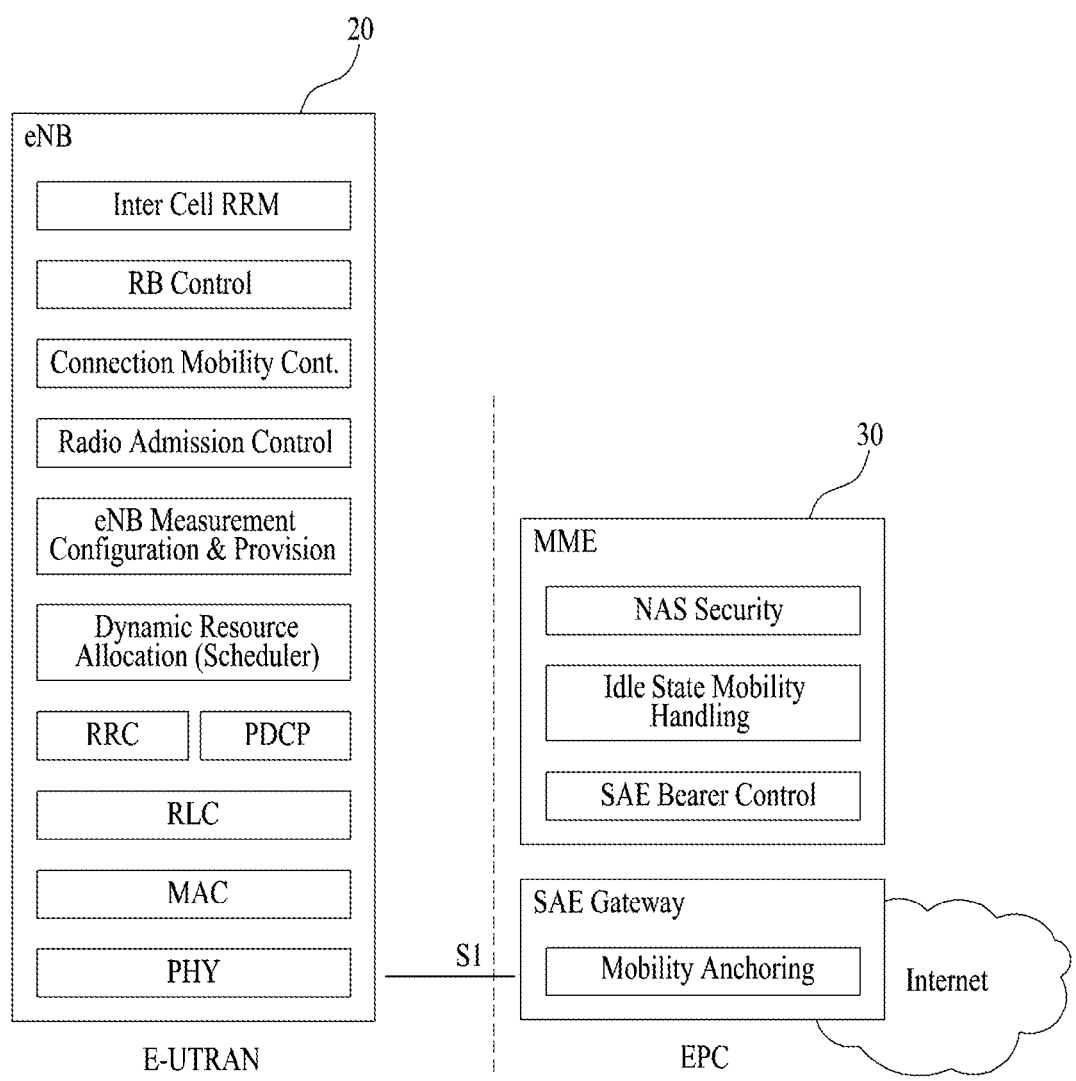
FIG. 3A is a block diagram illustrating general structures of general E-UTRAN and general EPC.

FIG. 3A is a block diagram illustrating general structures of general E-UTRAN and general EPC. Referring to FIG. 3A, the BS 20 may perform functions of selection for the gateway 30, routing toward a gateway while radio resource control (RRC) is enabled, scheduling and transmission of paging messages, scheduling and transmission of broadcasting channel (BCCH) information, dynamic allocation of a resource to the UEs 10 in downlink and uplink, configuration and provisioning of BS measurements, wireless bearer control, radio admission control (RAC), and connection mobility control in an LTE_ACTIVE state.

As described above, in the EPC, the gateway 30 may perform functions of paging origination, LTE_IDLE state control, ciphering of a user plane, SAE barer control, and integrity protection of non-access stratum (NAS) signaling.

Figure 3B:
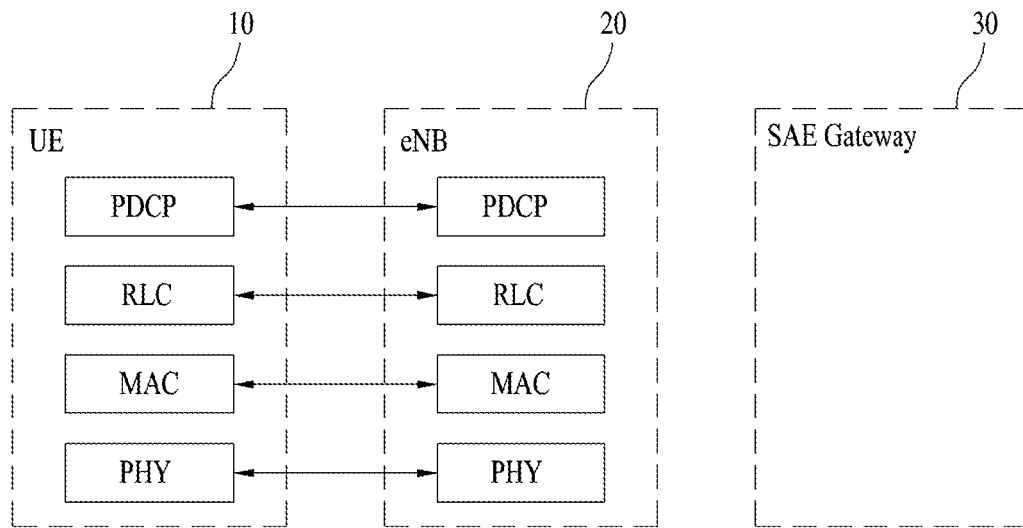
FIG. 3B is a block diagram illustrating user-plane protocol stack for an E-UMTS network.
Figure 3C:
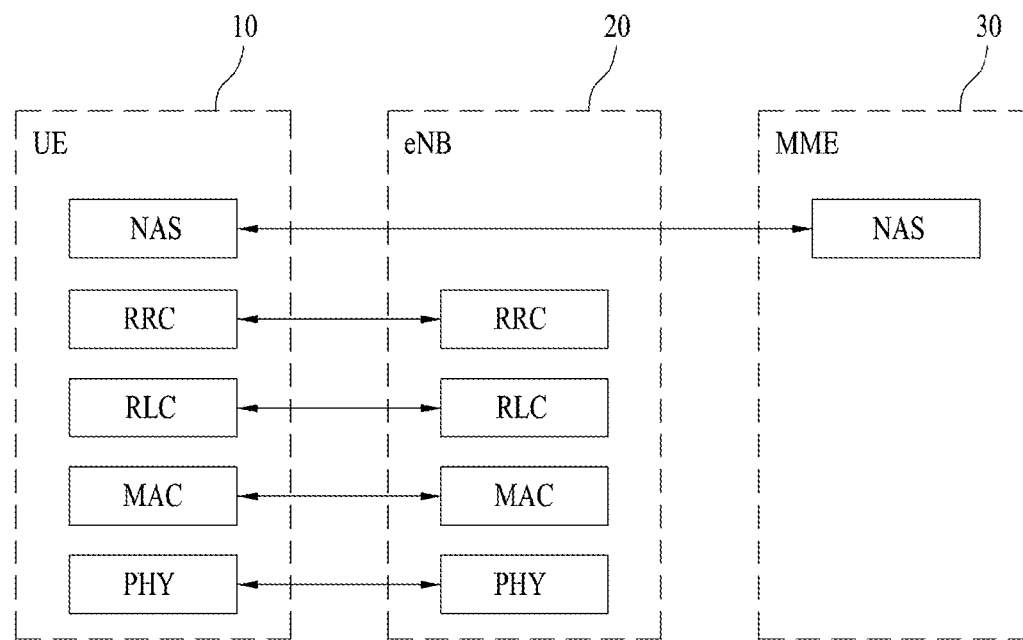
FIG. 3C is a block diagram illustrating control-plane protocol stack for an E-UMTS network.

FIGS. 3B and 3C are block diagrams illustrating user plane protocol and control plane protocol stack for an E-UMTS network. Referring to FIGS. 3B and 3C, protocol layers may be classified into a first layer L1, a second layer L2, and a third layer L3 based on three lower layers of an open system interconnection (OSI) standard model.

The first layer L1 (or a physical layer (PHY)) provides an information transfer service to a higher layer using a physical channel. The PHY is linked to a medium access control (MAC) layer positioned in a higher layer through a transport channel. Data between the MAC layer and the PHY is transmitted through the transport channel. Data between different PHYs, i.e., between PHYs of a transmitter and a receiver (e.g., between PHYs of the UE 10 and the BS 20) is transmitted through a physical channel 21.

The MAC layer of the second layer L2 provides a service to a radio link control (RLC) layer corresponding to a higher layer through a logical channel. The MAC layer of the second layer L2 supports reliable data transmission. The RLC layer illustrated in FIGS. 3B and 3C is illustrated as the RLC layer is not necessary when MAC RLC functions are implemented and are performed in the MAC layer. Referring to FIG. 3B, a packet data convergence protocol (PDCP) layer of the second layer L2 performs a header compression function of reducing unnecessary control information to efficiently transmit an IP packet such as IPv4 or IPv6 in a radio interface having a narrow bandwidth.

Referring to FIG. 3C, an RRC layer of the third layer L3 corresponding to the lowest of three layers is defined only in the control plane. The RRC layer controls logical channels, transport channels and physical channels with respect to configuration, reconfiguration and release of radio bearers (RBs). Here, RBs refers to a service provided by the second layer L2 for data transmission between a UE and an E-UTRAN.

Referring to FIG. 3B, the RLC and MAC layers (which are terminated in the BS 20 in a network) perform functions such as scheduling, automatic repeat request (ARQ), and hybrid automatic repeat request (HARQ). The PDCP layer (which is terminated in the BS 20 in a network) may perform a user plane function such as header compression, integrity protection, and ciphering.

Referring to FIG. 3C, the RLC and MAC layers (which are terminated in the BS 20 in a network) perform the same functions as in a control plane. As exemplified above, the RRC layer (which is terminated in the BS 20 in a network) may perform functions such as broadcasting, paging, RRC connection control, radio bearer (RB) control, mobility function, and UE measurement report and control. A NAS control protocol terminated in the MME gateway 30 in a network may perform a function such as SAE bearer control, authentication, LTE_IDLE mobility handling, paging start in LTE_IDLE, and security control for signaling between gateways and the UE 10.

The NAS control protocol may user three different states: first, LTE_DETACHED state in which there is no RRC entity, second, LTE_IDLE state in which there is no RRC connection but minimum UE information is stored, and third, LTE_ACTIVE state in which RRC connection is established.

The RRC state may be classified into two different states such as RRC_IDLE and RRC_CONNECTED. In the RRC_IDLE state, the UE 10 may receive broadcasting of paging information and system information, specifies discontinuous reception (DRX) configured with NAS, and is allocated with an identifier (ID) for uniquely identifying the UE 10 in a tracking region. In addition, in the RRC_IDLE state, there is no context stored in the BS 20.

In the RRC_IDLE state, the UE 10 specifies a paging DRX cycle. In particular, the UE 10 monitors a paging signal in the case of specific paging of each UE-specific paging DRX cycle.

In the RRC_CONNECTED state, the UE 10 includes E-UTRAN RRC connection and context in the E-UTRAN and transmits and/or receives data to/from an available network (BS). In addition, the UE 10 may report channel quality information and feedback information to the BS 20.

In the RRC_CONNECTED state, the E-UTRAN knows a cell to which the UE 10 belongs. Accordingly, a network may transmit/receive data to/from the UE 10, control mobility (handover) of the UE 10, and perform cell measurement on a neighbor cell.

Figure 4A:
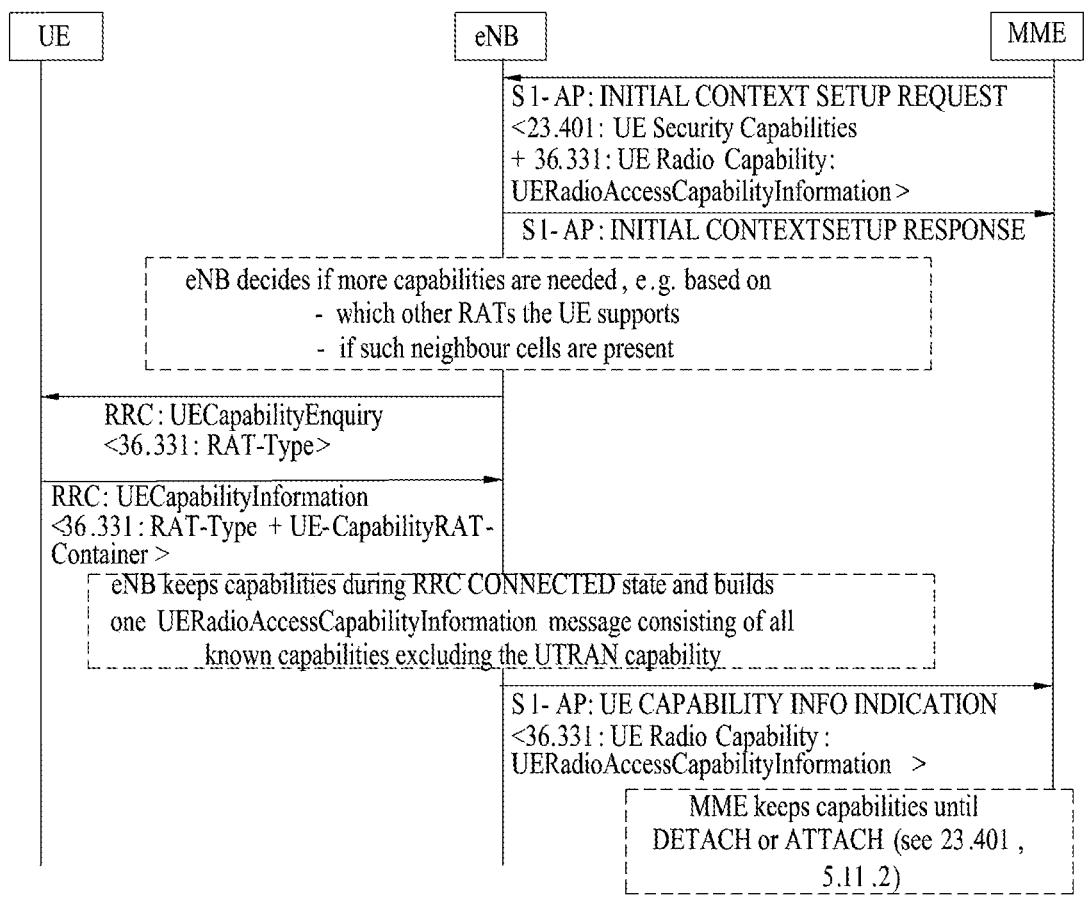
FIG. 4 is a diagram illustrating a network structure for explanation of an interworking structure of a first communication system (e.g., an LTE system) and a second communication system (e.g., a WiFi system)

FIG. 4A is a diagram illustrating a procedure for negotiation of UE capabilities in the 3GPP TS 36.300 standard.

Referring to FIG. 4A, a MME transmits an initial context setup request message to an eNB through a S1 interface. In response to the message, the eNB also transmits an initial context setup response message to the MME. The eNB determines whether more capabilities are needed based on other RAT information items for supporting the corresponding UE and whether neighbor cells are preset. The eNB may transmit a UECapabilityEnquiry message as an RRC message to the UE to ask the UE about UE capabilities. Then the UE may transmit information about capabilities supported by the UE to the eNB through a UECapabilityEnquiryinformation message. The eNB keeps capabilities during RRC_CONNECTED state and builds one UERadioAccess-CapabilityInformation consisting of all known capabilities excluding UTRAN capabilities. The eNB transmits a message (e.g., a UE Capability info indication message) including UE capability information to the MME. The MME keeps capabilities until DETACH or ATTACH.

Figure 4B:
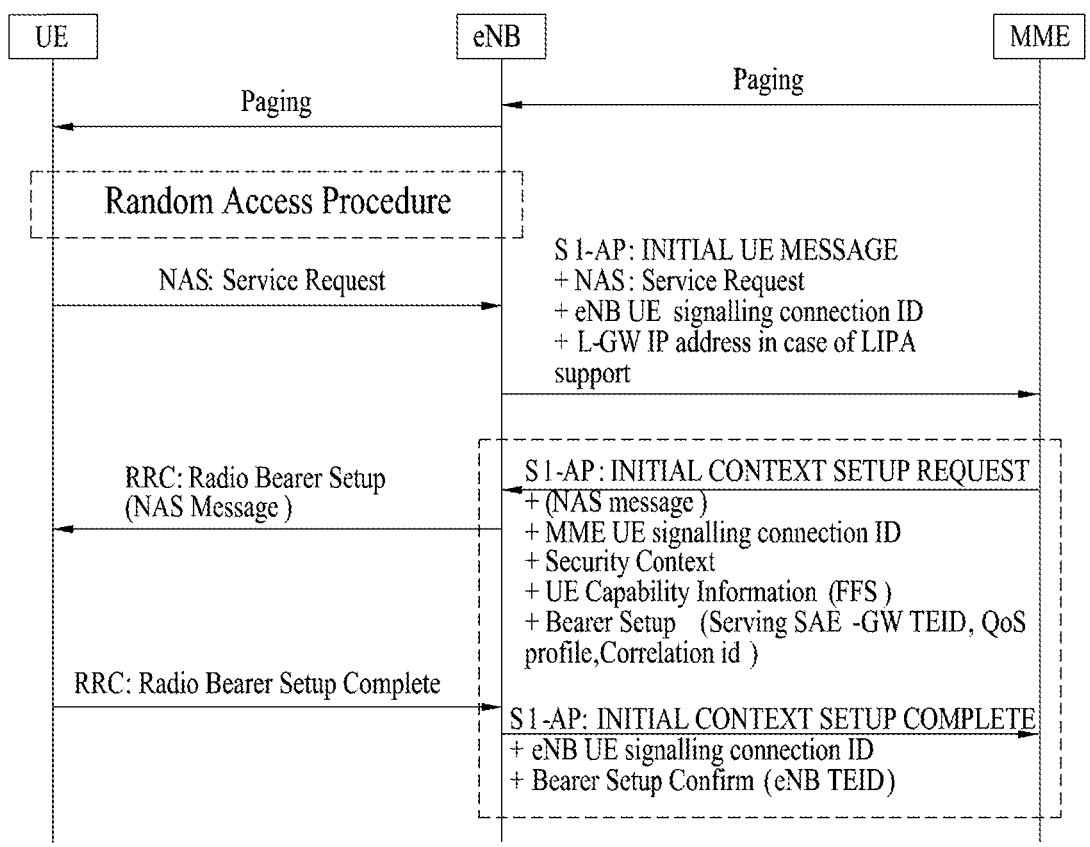

FIG. 4B is a diagram for explanation of an initial context setup procedure in the 3GPP TS 36.300 standard.

Referring to FIG. 4B, a MME transmits a paging message to an eNB and the eNB transmits the paging message to a UE. Then the UE performs a random access procedure with the eNB. The UE transmits a service request as a NAS message to the eNB. The eNB transmits the service request to the MME. The MME transmits an initial context setup request message to the eNB. The eNB transmits a radio bearer setup message as an RRC or NAS message. After radio bearer setup is completed, the UE transmits a radio bearer setup complete message to the eNB.

Figure 5:
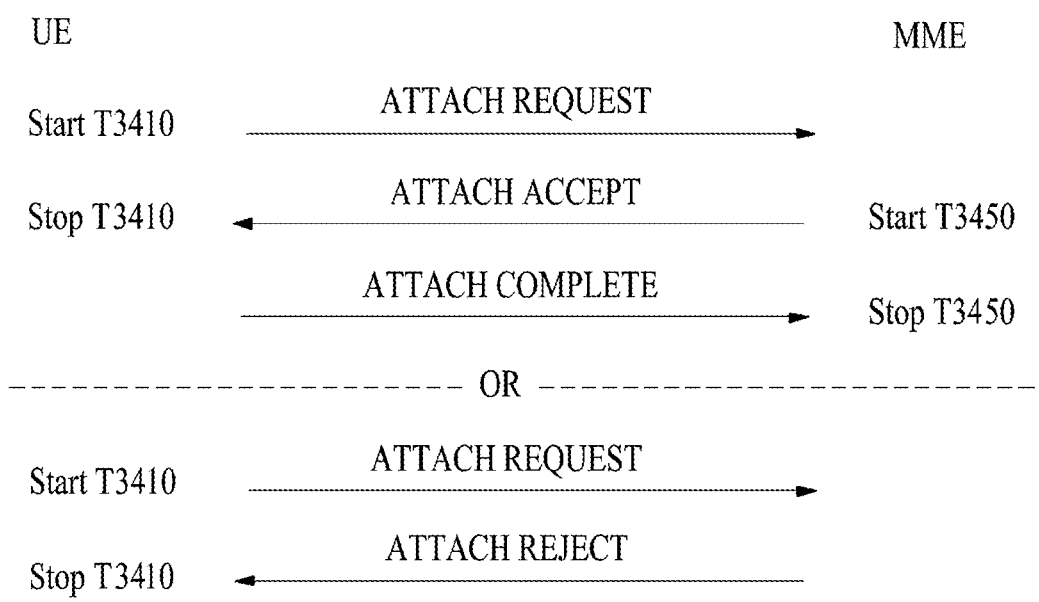
FIG. 5 is a diagram for explanation of an attach procedure for an evolved packet system (EPS) service.

FIG. 5 is a diagram for explanation of an attach procedure for an evolved packet system (EPS) service.

The procedure is used by a UE for the EPS service only. Upon initiating the attach procedure for a normal service, the UE needs to indicate "EPS attach" in an EPS attach type IE. Upon initiating the attach procedure for an urgent bearer service, the UE needs to indicate "EPS emergency attach" in the EPS attach type IE. In an EPS mobility management (EMM)-DEREGISTERED state, the UE may transmit an attach request message to a MME to initiate the attach procedure, start a timer T3410, and enter the EMM-REGISTERED-INITIATED state. When a timer T3402 is currently running, the UE needs to stop the T3402. When the timer T3411 is running, the UE needs to stop the timer T3411.

Table 1 below shows ATTACH ACCEPT message content.

TABLE 1

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach accept message identity | Message type 9.8 | M | V | 1 |
| | EPS attach result | EPS attach result 9.9.3.10 | M | V | ½ |
| | Spare half octet | Spare half octet 9.9.2.9 | M | V | ½ |
| | T3412 value | GPRS timer 9.9.3.16 | M | V | 1 |
| | TAI list | Tracking area identity list 9.9.3.33 | M | | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 53 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |

Table 2 below shows ATTACH COMPLETE message content.

TABLE 2

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach complete message identity | Message type 9.8 | M | V | 1 |
| | ESM message container | ESM message container 9.9.3.15 | M | LV-E | 5-n |

Table 3 below shows ATTACH REJECT message content.

TABLE 3

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach reject message identity | Message type 9.8 | M | V | 1 |
| | EMM cause | EMM cause 9.9.3.9 | M | V | 1 |
| 78 | ESM message container | ESM message container 9.9.3.15 | O | TLV-E | 6-n |
| 5F | T3346 value | GPRS timer 2 9.9.3.16A | O | TLV | 3 |
| 16 | T3402 value | GPRS timer 2 9.9.3.16A | O | TLV | 3 |

Table 4 below shows ATTACH REQUEST message content.

TABLE 4

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attacht request message identity | Message type 9.8 | M | V | 1 |
| | EPS attach type | EPS attach type 9.9.3.11 | M | V | ½ |
| | NAS key set identifier | NAS key set identifier 9.9.3.21 | M | V | ½ |
| | EPS mobile identity | EPS mobile identity 9.9.3.12 | M | | 5-12 |
| | UE network capability | UE network capability 9.9.3.34 | M | | 3-14 |
| | ESM message container | ESM message container 9.9.3.15 | M | LV-E | 5-n |
| 19 | Old P-TMSI signature | P-TMSI signature 26 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| D- | Device properties | Device properties 9.9.2.0A | O | TV | 1 |
| E- | Old GUTI type | GUTI type 9.9.3.45 | O | TV | 1 |

TABLE 4-continued

| IEI | Information Element | Type/Reference | Presence | Format | Length |
| --- | --- | --- | --- | --- | --- |
| C- | MS network feature support | MS network feature support 9.9.3.20A | O | TV | 1 |
| 10 | TMSI based NRI container | Network resource identifier container 9.9.3.24A | O | TLV | 4 |

The attach procedure for the EPS service and information associated therewith can be applied to an attach procedure with a cellular network (e.g., an LTE network) by an eAP that will be described in the present invention. From a cellular network point of view, the eAP may be deemed to be a UE.

Switching based inter RAT technology is designed based on a UE request, does not require interworking between a wireless LAN and a cellular network, and allows a specific network server to manage wireless LAN information so as to enable inter RAT handover according to a UE request. This means that, even if a UE has multi-RAT capability, the UE can access one RAT at one time and cannot simultaneously access multiple RATs. Accordingly, prior art does not require control connection between an AP and a cellular network. However, for simultaneous transmission and reception toward a multi-RAT and more tightly-coupled management, direct control connection between different RATs may be setup, and thus more efficient and rapid inter-RAT interworking is required.

First, a network structure in which a plurality of communication systems interworks will be described.

Figure 6:
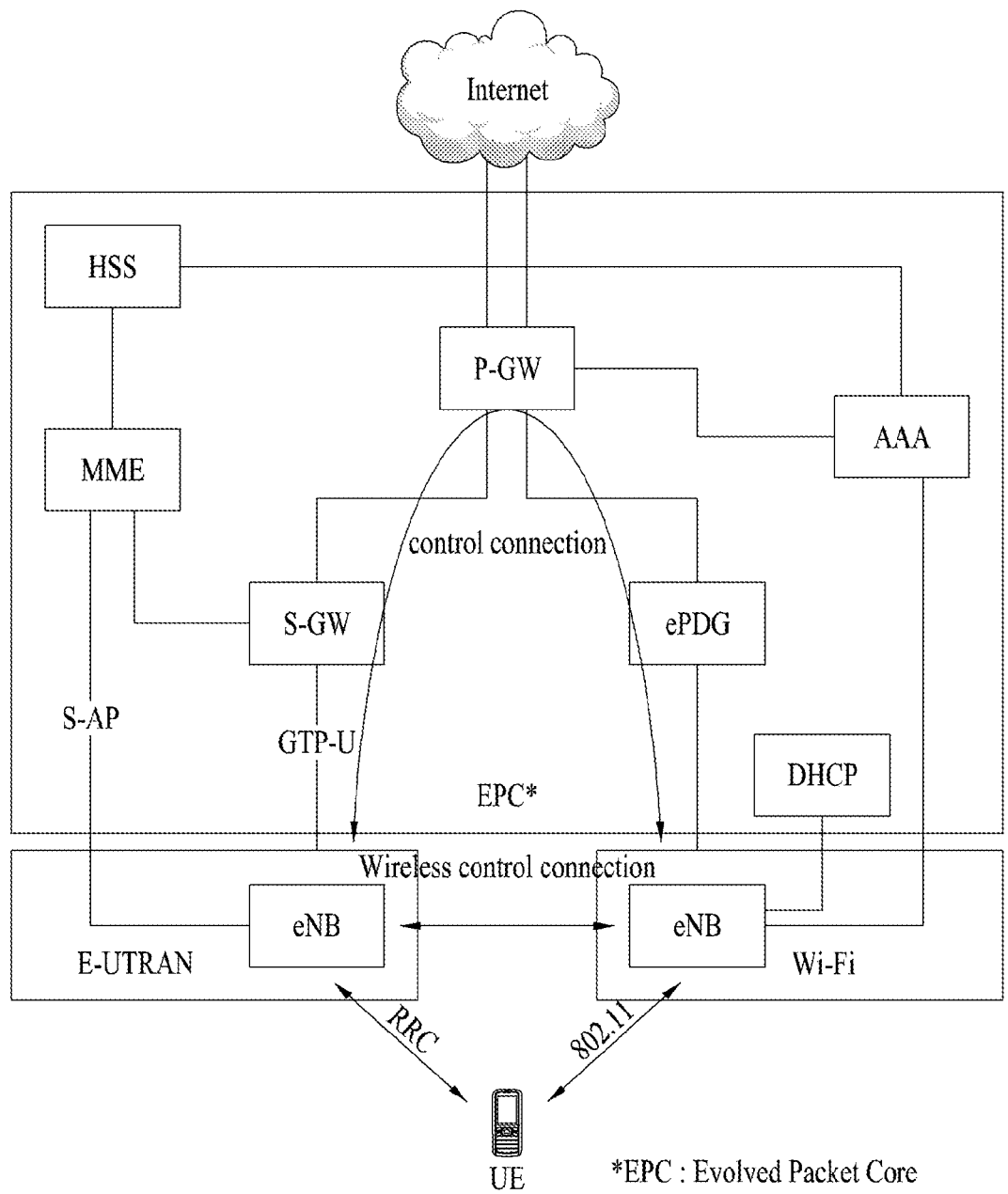
FIG. 6 is a diagram illustrating a network structure for explanation of an interworking structure of a first communication system (e.g., an LTE system) and a second communication system (e.g., a WiFi system)

FIG. 6 is a diagram illustrating a network structure for explanation of an interworking structure of a first communication system (e.g., an LTE system) and a second communication system (e.g., a WiFi system).

In the network structure illustrated in FIG. 6, backhaul control connection may be present between an AP and an eNB through a backbone network (e.g., P-GW or an evolved packet core (EPC)) or wireless control connection may be present between the AP and the eNB. For peak throughput and data traffic off-loading, the UE may simultaneously support both a first communication system (or a first communication network) using a first wireless communication method through interworking between a plurality of communication networks and a second communication system (or a second communication network) using a second wireless communication method. Here, the first communication network or the first communication system may be referred to as a primary network or a primary system and the second communication network or the second communication system may be referred to as a secondary network or a secondary system. For example, a UE may be configured to simultaneously support LTE (or LTE-A) and WiFi (a local area communication system such as WLAN/802.11). The UE may be referred to as a multi-system capability UE or the like, in this specification.

In the network structure illustrated in FIG. 6, the primary system may be a network having wider coverage and for transmission of control information. An example of the primary system may include a WiMAX or LTE (LTE-A) system. The secondary system may be a network having smaller coverage and may be a system for data transmission. The secondary network may be, for example, a wireless LAN system such as WLAN or WiFi.

The following assumption is applied to the present invention.

It is assumed that connection is setup on a radio link between an AP as an access point of a secondary system (e.g., WiFi) and an eNB as an access point of a primary system (e.g., a cellular communication system such as an LTE system or a WiMAX system). In the present invention, an AP having a wireless interface with an eNB will be referred to as an eAP. That is, this means that the eAP needs to support LTE protocol stack or WiMAX protocol stack for communication with an eNB as well as 802.11 MAC/PHY and can function as a UE with respect to an eNB and communicate with the eNB.

According to the present invention, an AP information updating method is divided into three scenarios according to an AP information control entity and will be described (Case 1: when the AP information control entity is an eNB, Case 2: when the AP information control entity is a MME, and Case 3: when the AP information control entity is a new network entity (for example, when a new interworking server or access network discovery & selection function (AND SF)).

In an environment in which a UE that can simultaneously transmit and receive data through WiFi and a cellular network is present, the present invention proposes a radio link (or a radio interface) to be present between a WiFi AP and a cellular network eNB (e.g., eNB or ABS) in order to more efficiently use a WiFi-cellular converged network by a dual mode UE. As such, in an environment in which an AP and an eNB have a radio interface, when a new eAP is registered using a corresponding radio interface, the present invention proposes a method for updating new eAP information to a dual mode UE or a neighbor network entity (eNB/MME/interworking entity (IWE)) by an eNB/MME/new network entity.

Figure 7A:
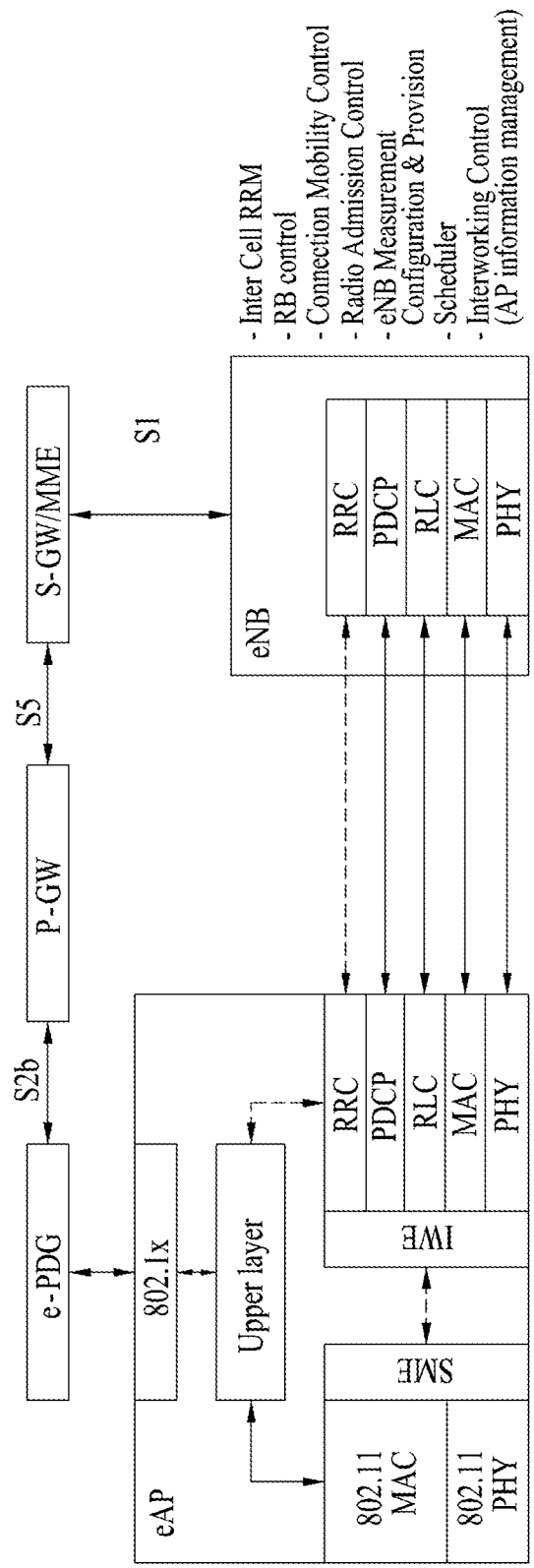
FIG. 7A is a diagram illustrating a configuration of a protocol of an eAP when an AP information control entity is an eNB (case 1) and FIG. 7B is a diagram illustrating a configuration of a protocol of an eAP when an AP information control entity is a MME (case 2)
Figure 7B:
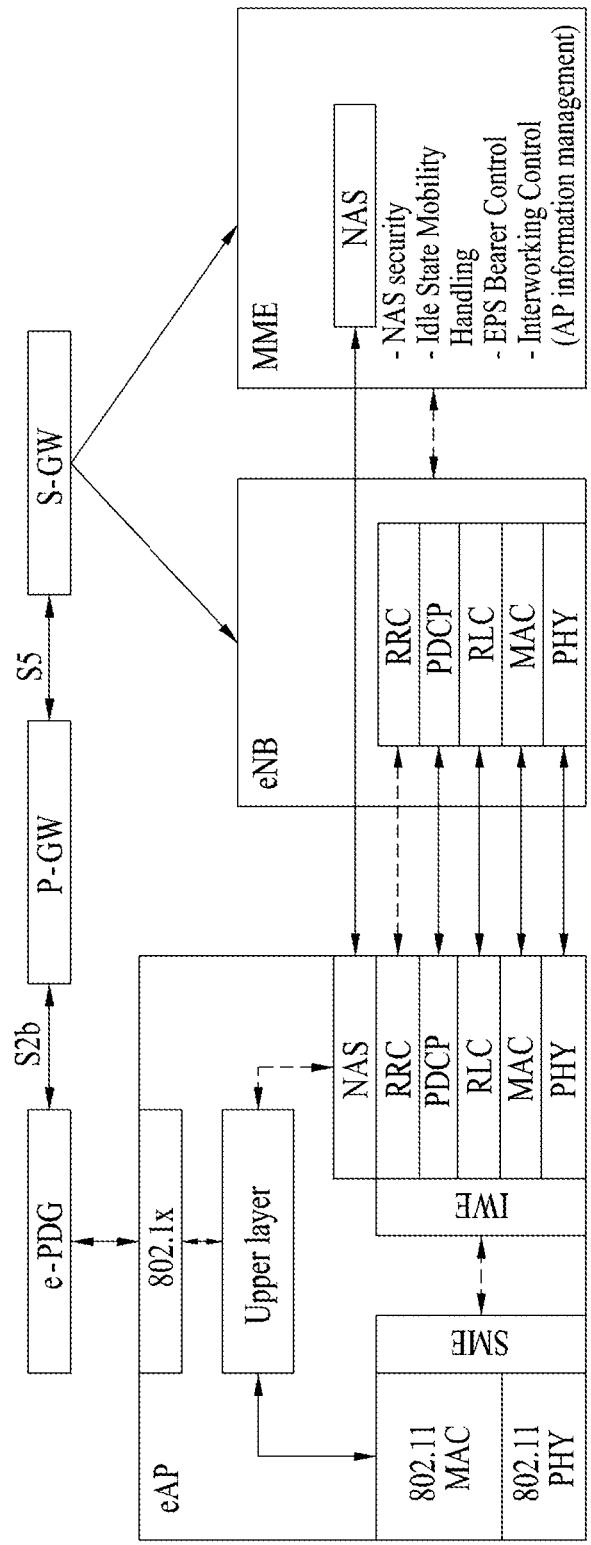

FIG. 7A is a diagram illustrating a configuration of a protocol of an eAP when an AP information control entity is an eNB (case 1). FIG. 7B is a diagram illustrating a configuration of a protocol of an eAP when an AP information control entity is a MME (case 2).

As illustrated in FIG. 7A, when the eNB is an AP information control entity, the eAP communicates with only the eNB and has only a control path of PHY, MAC, RLC, PDCP, and RRC layers. As necessary, the eNB may be connected up to a data path as well as a control path.

As illustrated in FIG. 7B, when an AP control server is in a MME, an eAP needs to directly transmit information of the AP to the MME, and in this end, the present invention proposes that an LTE part protocol stack of the eAP is present up to a non-access stratum (NAS) layer. When the eAP can communicate directly with the MME and includes a NAS layer as well as PHY, MAC, RLC, PDCP, and RRC layers, the eNB and the eAP need to be connected up to control/data path for transmission of a NAS control message.

Figure 8A:
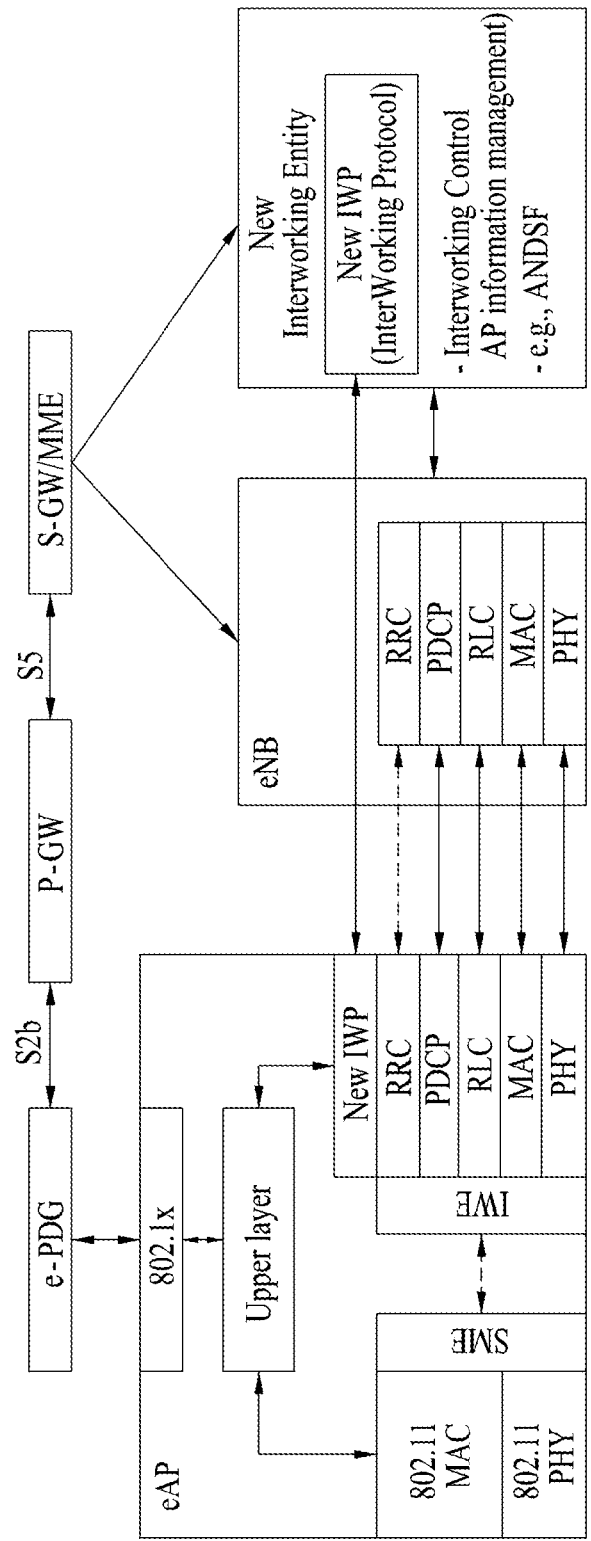
FIGS. 8A and 8B are diagrams illustrating a configuration of a protocol of an eAP when an AP information control entity is a new networking entity (case 3)
Figure 8B:
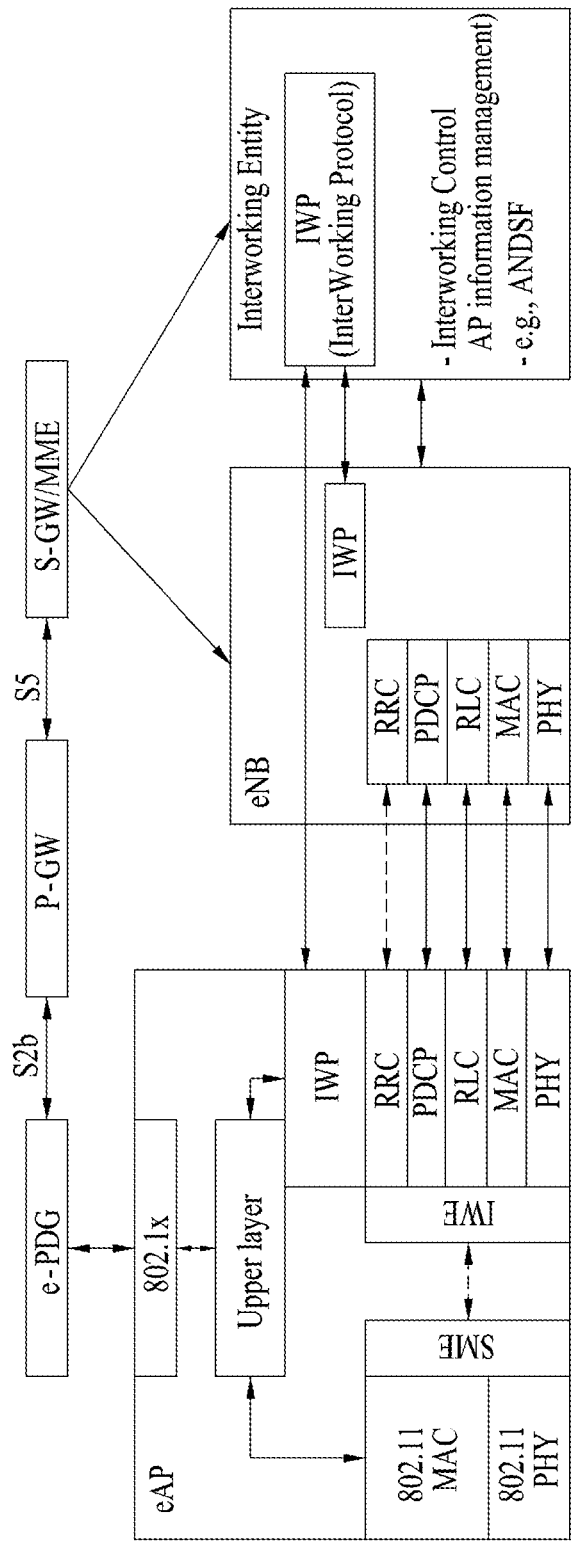

FIGS. 8A and 8B are diagrams illustrating a configuration of a protocol of an eAP when an AP information control entity is a new networking entity (case 3).

Referring to FIGS. 8A and 8B, when an AP control server is in a new interworking entity (e.g., a server such as ANDSF) for interworking, the eAP needs to directly transmit information of the eAP to a new interworking entity, and in this end, LTE part protocol stack of the eAP may require a new protocol layer that can communicate with a new network entity and include the new protocol layer. When the eAP may directly communicate with a new interworking entity (IWE) and include a new protocol layer as well as PHY, MAC, RLC, PDCP, and RRC layers, the eAP is connected to a data path as well as control with eNB. In particular, in the case of FIG. 8B, an eNB may also require a new interface (e.g., an IWP layer) for communication with an IWE.

Embodiment 1: When AP Information Control Entity is eNB

Figure 9:
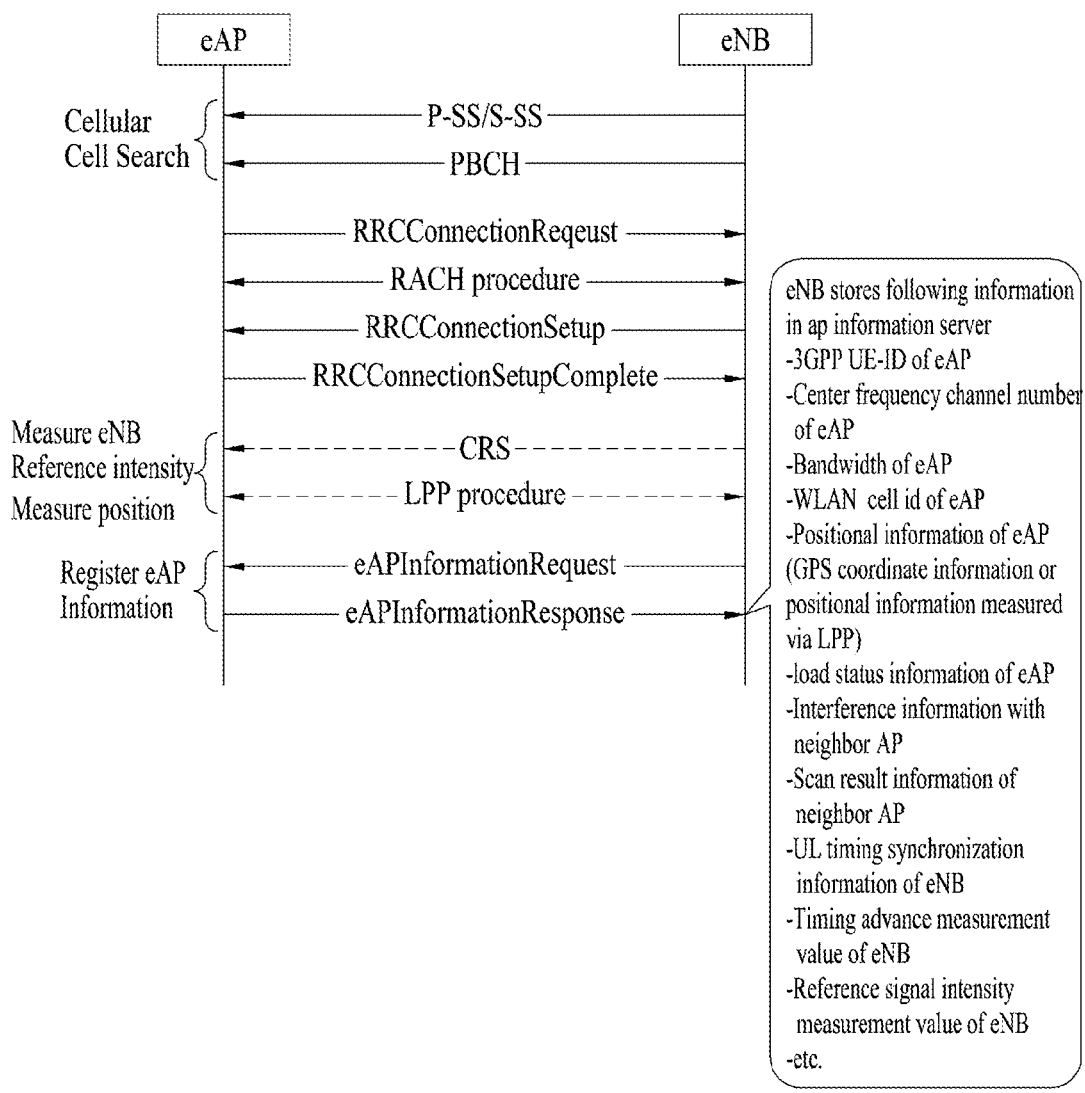
FIG. 9 is a diagram for explanation of an eAP information transmission procedure when an AP information control entity is an eNB.

FIG. 9 is a diagram for explanation of an eAP information transmission procedure when an AP information control entity is an eNB.

eAP Initial Connection Establishment Procedure

A condition for triggering the eAP initial connection establishment procedure corresponds to cases in which 1) the eAP is powered on, 2) the eAP is moved to new cellular coverage, and 3) cellular-WiFi converged scenario is determined to be applied to UE(s) in a cellular system.

For cell search by the eAP, the eAP may receive a primary synch signal (P-SS) and a secondary synch signal (S-SS) to acquire a physical cell ID of the eNB (S910). As a method for checking whether an eNB supports interworking, the eAP may check whether interworking is supported, from information (e.g., whether interworking is supported is indicated by a size of 1 bit) of a system information block (SIB) received from the eNB or a master information block (MIB) in a physical broadcasting channel (PBCH) (S920). Alternatively, the eNB may newly define a new type of SIB (i.e., SIB-n) (n is an integer equal to or greater than 16 in system information block type SIB-n that is newly proposed by the present invention) for WiFi-cellular interworking control information, and when new SIB-n is defined, the eAP may recognize whether the eNB supports interworking according to whether scheduling SIB-n is present through SIB-1 received from the eNB. The eAP may identify a physical cell ID of a cellular eNB for supporting interworking between a wireless LAN and a cellular network through cell search.

Perform Connection Establishment with eNB (without NAS Message)

The eAP may transmit an RRCConnectionReqeust message without NAS ATTACH REQUEST unlike a legacy LTE UE (S930). A parameter "establishmentCause" may be defined as a parameter indicating establishment of connection of the eAP, such as "eAP originating Access". In addition, an ID indicating that a UE-identity is an eAP (e.g., reserved ID allocation) is transmitted to the eNB. The eAP may perform a random access procedure (RACH) with the eNB (S940) and receive an RRCconnectionsetup message from the eNB (S950). In the connection establishment, a parameter associated with NAS in which a legacy UE is operated may be configured to be omitted or configured to be a meaningless value. After RRC connection establishment complete, the eAP may transmit an RRCconnectionsetupcomplete message indicating RRC connection establishment complete to the eNB (S960).

The eAP may receive a cell-specific reference signal (CRS) from the eNB and measure reference signal intensity of the eNB (S970). In addition, the eAP may measure a position of the eAP via an LTE positioning protocol (LPP) procedure according to the GPS or 3GPP TS 36.355 standard (S980).

eAP Information Registration Procedure

A network (E-UTRAN) may transmit an eAPInformationRequest message to initiate the procedure. The eNB may transmit a message for requesting eAP information (e.g., an eAPInformationRequest message) to the eAP (S990). In response to the eAPInformationRequest message, the eAP may transmit information of the eAP to the eNB through an eAP information response message (e.g., an eAPInformationResponse message) via connection established with the eNB (S995). The eAP may transmit information of the eAP and eNB related measurement information, contained in the eAPInformationResponse message, to the eNB.

The eAPInformationResponse message may be transmitted and may include at least one of an ID (or a UE-ID) of an eAP in a 3GPP network of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB. The eNB that receives the eAPInformationResponse message may store corresponding information as a database (DB) in a server of the eNB, consider the corresponding eAP as a wireless LAN that belongs to coverage of the eNB, and perform a procedure associated with a UE for supporting WiFi-cellular interworking using the corresponding information.

Unlike in FIG. 9, without request according to transmission of the eAPInformationRequest message, the eAP may transmit the eAPInformationResponse message in an unsolicited manner.

Figure 10:
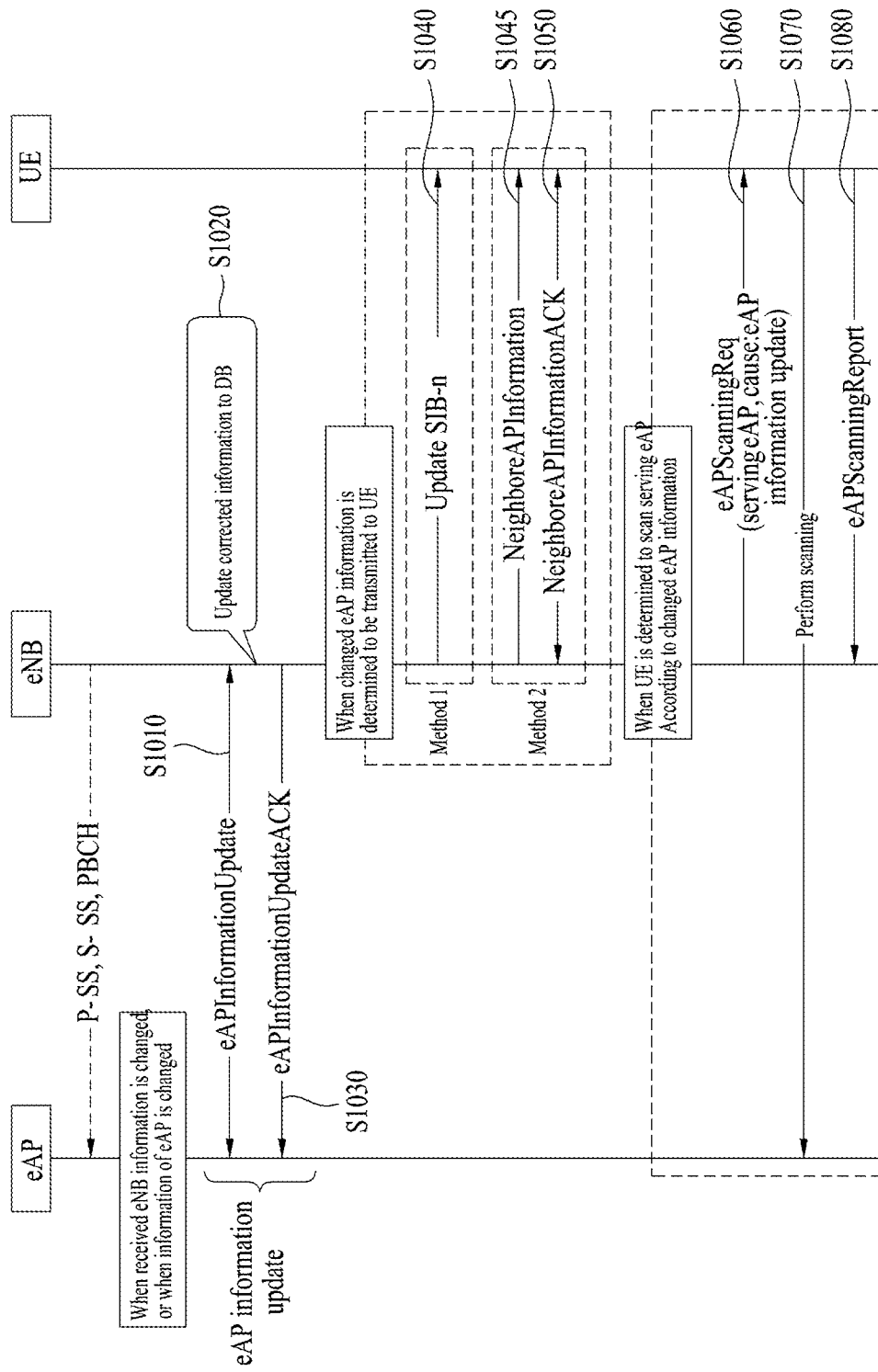
FIG. 10 is a diagram for explanation of a procedure for updating AP information when an AP information control entity is an eNB.

FIG. 10 is a diagram for explanation of a procedure for updating AP information when an AP information control entity is an eNB.

The procedure of FIG. 10 is performed when AP information needs to be updated after the AP information is registered, as described with reference to FIG. 9. An eAP may trigger eAP information update when one of eAP information items (e.g., location information, load status, interference information with neighbor AP(s), etc.) is changed or information of the eNB to which the eAP belongs (for example, when the eNB is changed due to movement of the eAP or when eNB information received from the eNB is changed (e.g., signal intensity, uplink timing synchronization information, timing advance value, etc. are changed)). When the eAP information update is triggered, the eAP may transmit update information of the eAP to the eNB via connection established with the eNB (S1010). That is, when information of the eAP is corrected or eNB related measurement information is changed, the eAP may transmit a message (e.g., an eAPInformationUpdate message) including the update information to the eNB (S1010). In terms of E-UTRAN, the eAPInformationUpdate message may be received from the eAP to initiate an eAP update information procedure.

The eAPInformationUpdate message may be transmitted and may include information that is corrected or changed from information such as a 3GPP UE-ID of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB. Here, a reference for determining that information of an eNB is numerically changed (e.g., an interference value, a reference measurement value, etc.) is deemed to be changed to a predefined threshold value or more.

Then the eNB updates the received corrected information to a DB and stores the information (S1020). In addition, the eNB transmits a message (e.g., an eAPInformationUpdateACK message) indicating that the update information is appropriately stored) to the eAP (S1030).

When the eAP information is updated and the changed or updated eAP information needs to be transmitted to a UE that is communicating with the eAP with updated information, the eNB may notify the corresponding UE of the changed or updated eAP information. In this case, as method 1, the eNB may transmit the updated eAP information to the corresponding UE using a broadcast method (S1040). The eNB needs to periodically broadcast eAP related information for a dual mode UE. An example of an RRC message for transmission of neighbor eAP information may include an SIB-n (here, n is an integer equal to or more than 16) message. As method 2, the updated eAP information may be transmitted using a unicast method (S645). The eNB may transmit the eAP related information to only a UE that needs to be connected to the eAP as a unicast message for the dual mode UE. An RRC message for transmission of neighbor eAP information may be defined and may include, for example, a neighboreAPInformation message. In response to transmission of the neighboreAPInformation message, the UE may transmit an acknowledgement message (e.g., a neighboreAPInformationAck message) indicating that the neighboreAPInformation message is appropriately checked, to the eNB (S1050).

When the UE needs to scan a serving eAP according to the updated eAP information, the eNB may transmit a message (e.g., an eAPScanningReq message) indicating (or requesting) eAP scanning During transmission of the scanning request message, the eNB may add information indicating "eAP Information Update" and serving eAP information to a cause field and transmit the information (S1060).

The UE that receives the eAPScanningReq message performs eAP scanning (S1070). In addition, the UE may transmit a message (e.g., an eAPScanningReport message) that reports the scanning result to the eNB (S1080).

Embodiment 2: When AP Information Control Entity is MME

Figure 11:
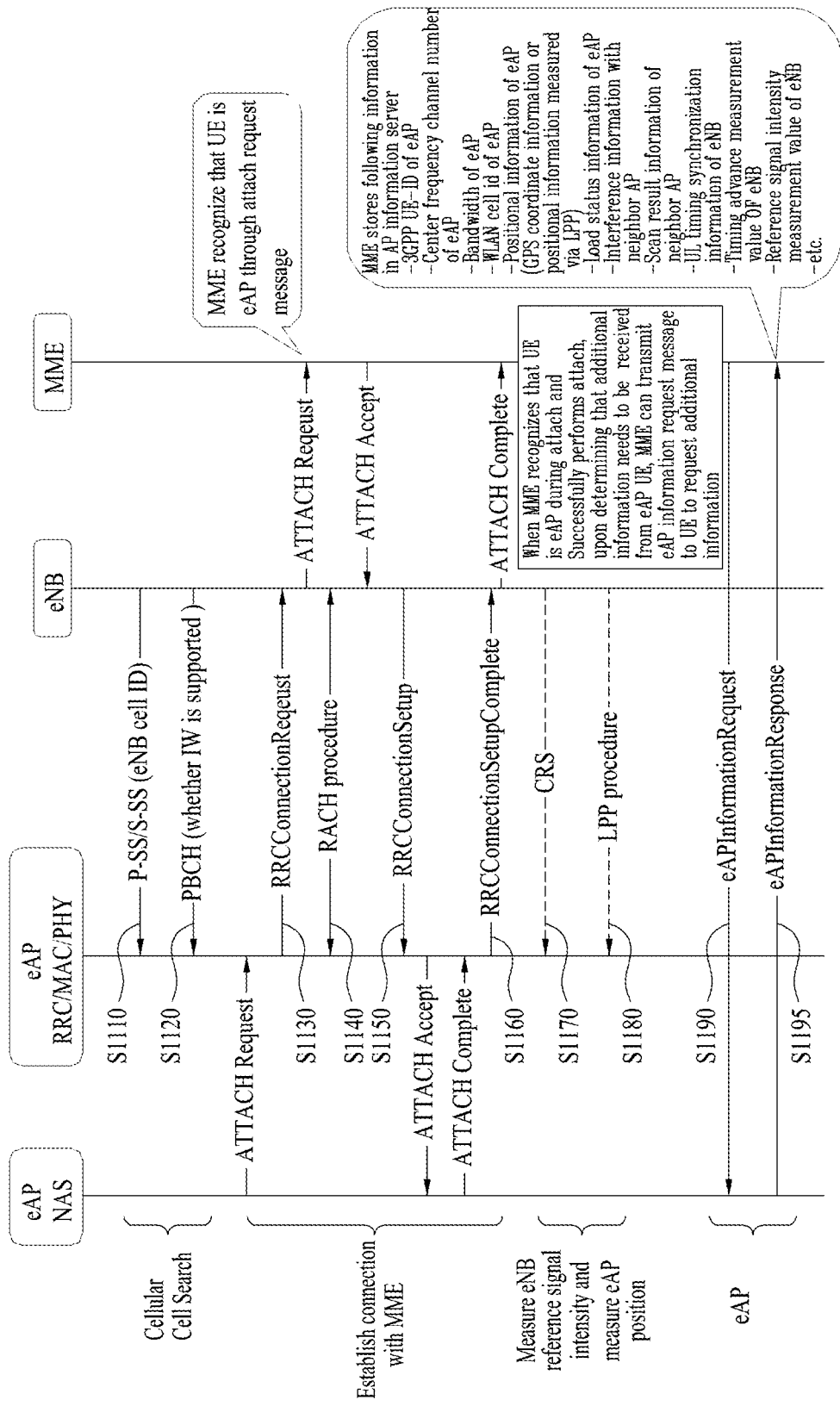
FIG. 11 is a diagram for explanation of a procedure for transmitting eAP information when an AP information control entity is a MME.

FIG. 11 is a diagram for explanation of a procedure for transmitting eAP information when an AP information control entity is a MME.

eAP Initial Connection Establishment Procedure

A condition for triggering the eAP initial connection establishment procedure corresponds to cases in which 1) the eAP is powered on, 2) the eAP is moved to new cellular coverage, and 3) cellular-WiFi converged scenario is determined to be applied to UE(s) in a cellular system.

For cell search, the eAP may receive a primary synch signal (P-SS) and a secondary synch signal (S-SS) to acquire a physical cell ID of the eNB (S1110). As a method for checking whether an eNB supports interworking, the eAP may check whether interworking is supported, from information (e.g., whether interworking is supported is indicated with 1 bit size) of a system information block (SIB) received from the eNB or a master information block (MIB) in a physical broadcasting channel (PBCH) (S1120). Alternatively, the eNB may newly define SIB-n for WiFi-cellular interworking control information, and when the new SIB-n, the eAP may determine whether the eNB supports interworking according to scheduling of SIB-n is present by receiving SIB-1 from the eNB. Via sell search, the eAP may identify a physical cell ID of a cellular eNB for supporting interworking between a wireless LAN and a cellular network.

Perform Connection Establishment with MME/eNB (Connection Establishment According to Attach or Service Request)

The eAP transmits an RRCConnectionReqeust message to the eNB through NAS ATTACH REQUEST like a legacy LTE UE (S1130). With regard to establishment of the NAS signaling connection, an EPS attach type may be defined as a new type indicating attachment to the eAP and establishmentCause may be defined as a parameter indicating connection establishment of the eAP such as "eAP originating Access". Alternatively, the eAP may transmit an ID indicating that a UE-Identity is an eAP (e.g., reserved ID allocation).

The eAP may perform a random access procedure (RACH) with the eNB (S1140) and receive a RRC connection setup message (e.g., RRCConnectionSetup message) from the eNB (S1150). After RRC connection establishment is completed, the eAP may transmit a message indicating RRC connection establishment complete (RRCConnectionSetupComplete message) to the eNB (S1160).

The eAP may receive a cell-specific reference signal (CRS) from the eNB and measure reference signal intensity of the eNB (S1170). Alternatively, the eAP may measure a position of the eAP via an LTE positioning protocol (LPP) procedure according to the GPS or 3GPP TS 36.355 standard (S1180).

eAP Information Registration Procedure

The eAP may transmit information of the eAP to the MME through a NAS message via connection established with the MME. The MME may transmit a message (e.g., an eAPInformationRequest message) for requesting eAP information to the eAP (S1190). When a corresponding UE is an eAP and additional information needs to be received during an attach step, the MME may transmit the corresponding message to the eAP.

In response to reception of the eAPInformationRequest message, the eAP may transmit a message (e.g., an eAPInformationResponse message) including information of the eAP and eNB related measurement information to the MME (S1195). Unlike in FIG. 11, the eAP may transmit the eAPInformationResponse message to the MME in an unsolicited manner. The eAPInformationResponse message may be transmitted and may include at least one of an ID (or a UE-ID) of an eAP in a 3GPP network of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB.

The MME that receives the eAPInformationResponse message may store corresponding information as a database (DB) in a server of the MME, consider the corresponding eAP as a wireless LAN that belongs to coverage of the MME, and perform a procedure associated with a UE for supporting WiFi-cellular interworking using the corresponding information.

Figure 12:
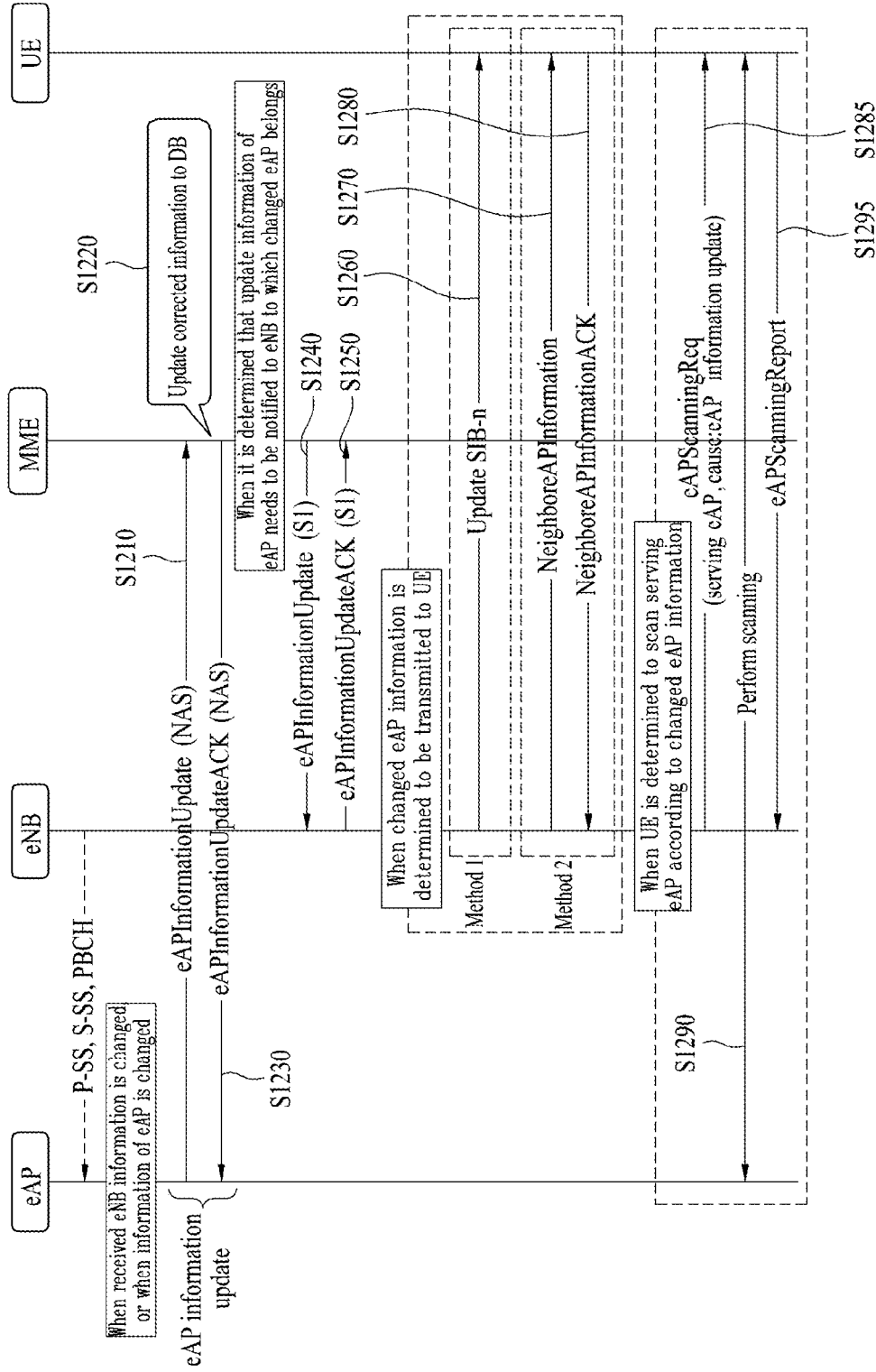
FIG. 12 is a diagram for explanation of a procedure for updating AP information when an AP information control entity is a MME.

FIG. 12 is a diagram for explanation of a procedure for updating AP information when an AP information control entity is a MME.

The procedure of FIG. 12 is performed when AP information needs to be updated after the AP information is registered, as described with reference to FIG. 11. An eAP may trigger eAP information update when one of eAP information items (e.g., location information, load status, interference information with neighbor AP(s), etc.) is changed or information of the eNB to which the eAP belongs (for example, when the eNB is changed due to movement of the eAP or when eNB information received from the eNB is changed (e.g., signal intensity, uplink timing synchronization information, timing advance value, etc. are changed)). When the eAP information update is triggered, the eAP may transmit update information of the eAP to MME via connection established with the MME (S1210). That is, when information of the eAP is corrected or eNB related measurement information is changed, the eAP may transmit a message (e.g., an eAPInformationUpdate NAS message) including the update information to the MME (S1210). In terms of E-UTRAN, the eAPInformationUpdate NAS message may be received from eAP to initiate an eAP update information procedure.

The eAPInformationUpdate NAS message may be transmitted and may include information that is corrected or changed from information such as a 3GPP UE-ID of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB.

Then the MME updates the received corrected information to a DB and stores the information (S1220). In addition, the MME transmits a message (e.g., an eAPInformationUpdateACK NAS message) indicating that the update information is appropriately stored) to the eAP (S1230).

When the eAP information is updated and the changed or updated eAP information needs to be transmitted to a UE that is communicating with the updated eAP, the MME may notify the corresponding UE of the changed or updated eAP information via the following method.

As method 1, the MME may transmit an eAPInformationUpdate message containing updated eAP information to an eNB to which the corresponding eAP belongs through an S1 interface (S1240). The eAPInformationUpdate message transmitted by the MME may include information contained in the eAPInformationUpdate NAS message transmitted by the eAP. The eNB that receives the eAPInformationUpate message from the MME may transmit a reception acknowledgement message (e.g., an eAPInformationUpdateACK message) to the MME (S1250).

When the eAP information is updated and the changed or updated eAP information needs to be transmitted to a UE that is communicating with the eAP with updated information, the eNB may notify the corresponding UE of the changed or updated eAP information. In this case, as method 1, the eNB may transmit the updated eAP information to the corresponding UE using a broadcast method (S1260). The eNB needs to periodically broadcast eAP related information for a dual mode UE. An example of an RRC message for transmission of neighbor eAP information may include an SIB-n. As method 2, the updated eAP information may be transmitted using a unicast method (S1270). The eNB may transmit the eAP related information to only a UE that needs to be connected to the eAP as a unicast message for the dual mode UE. An RRC message for transmission of neighbor eAP information may be defined and may include, for example, a neighboreAPInformation message. In response to transmission of the neighboreAPInformation message, the UE may transmit an acknowledgement message (e.g., a neighboreAPInformationAck message) indicating that the neighboreAPInformation message is appropriately checked, to the eNB (S1280).

When UE needs to scan a serving eAP according to the updated eAP information, the eNB may transmit a message (e.g., an eAPScanningReq message) indicating (or requesting) eAP scanning During transmission of the scanning request message, the eNB may add information indicating "eAP Information Update" and serving eAP information to a cause field and transmit the information (S1285).

The UE that receives the eAPScanningReq message performs eAP scanning (S1290). In addition, the UE may transmit a message (e.g., an eAPScanningReport message) that reports the scanning result to the eNB (S1295).

Figure 13:
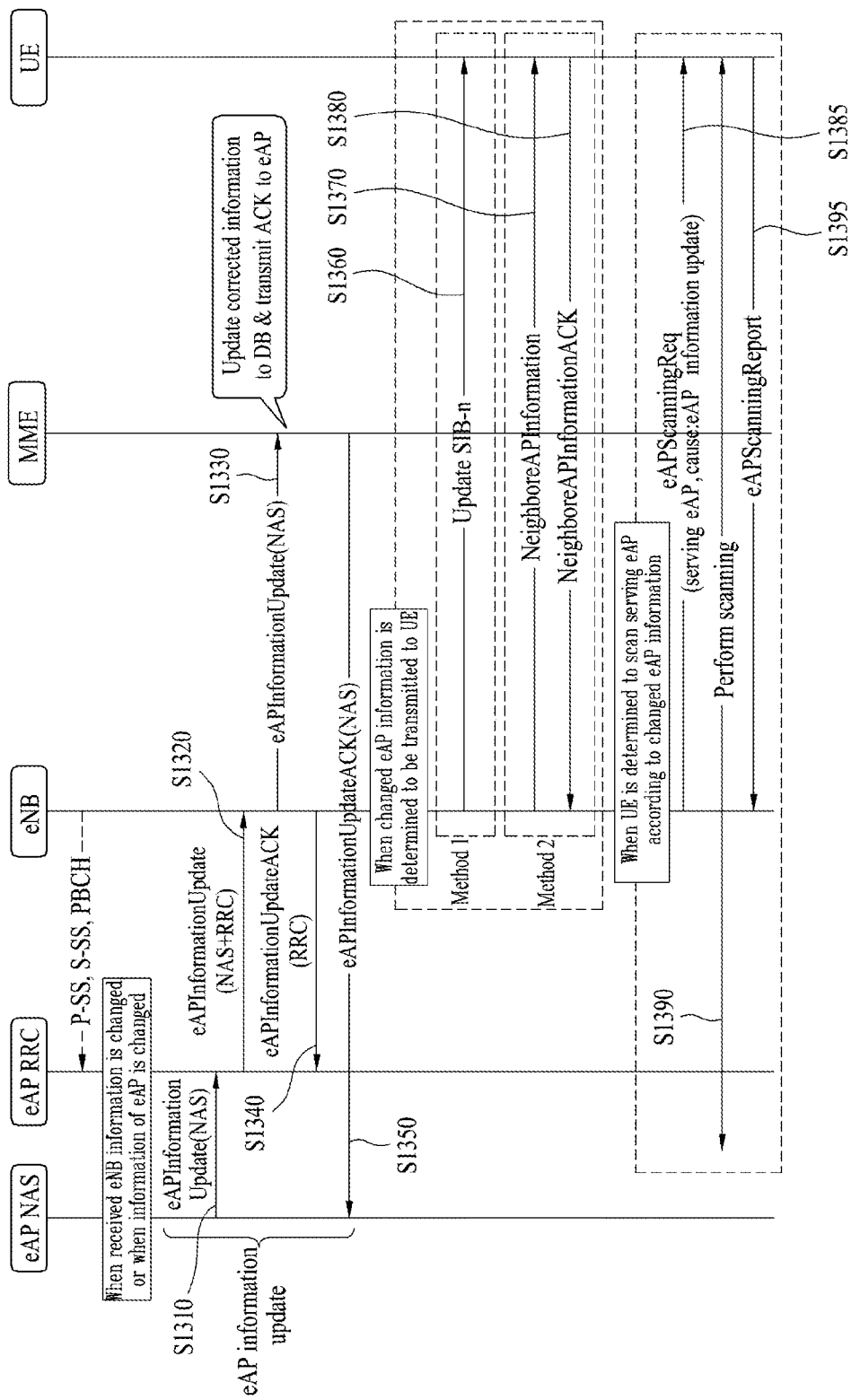
FIG. 13 is another diagram for explanation of a procedure for updating AP information when an AP information control entity is a MME.

FIG. 13 is another diagram for explanation of a procedure for updating AP information when an AP information control entity is a MME.

In FIG. 12, when eAP information is updated and the changed or updated eAP information needs to be transmitted to a UE that is communicating with the eAP with updated information, the MME transmits an eAPInformationUpdate message to the eNB through an S1 interface in order to notify the corresponding UE of the changed or updated eAP information. In FIG. 13 distinguished from FIG. 12, an update method through an RRC message will be described.

An eAP may trigger eAP information update when one of eAP information items (e.g., location information, load status, interference information with neighbor AP(s), etc.) is changed or information of the eNB to which the eAP belongs (for example, when the eNB is changed due to movement of the eAP or when eNB information received from the eNB is changed (e.g., signal intensity, uplink timing synchronization information, timing advance value, etc. are changed)). When the eAP information update is triggered, an eAP NAS layer may transmit update information of the eAP NAS layer to an eAP RRC layer through an eAPInformation Update (NAS) message (S1310). eAP RRC layer receives the eAPInformationUpdate message from the NAS layer, the eAP RRC layer may then generate an eAPInformationUpdate RRC control message in the corresponding message and transmit the eAPInformationUpdate RRC control message to the eNB (S1320). Information may include the same information as the NAS message.

The eNB that receives the eAPInformationUpdate RRC control message uses the corresponding information for eAP information control of the eNB and transmits the NAS message (eAPInformationUpdate (NAS)) to the MME (S1330). In addition, in response to the eAPInformationUpdate RRC control message, the eNB may transmit an eAPInformationUpdateACK RRC control message to the eAP RRC layer (S1340). In response to reception of the eAPInformationUpdate (NAS) message, the MME may transmit an acknowledgement message (e.g., eAPInformationUpdateACK (NAS) message) to the eAP NAS layer (S1350). Subsequent procedures to operation S1360 of FIG. 13 are the same as the subsequent procedures to operation S1260 of FIG. 12, and thus a detailed description thereof will be omitted and will be understood with reference to FIG. 12.

Embodiment 3: When AP Information Control Entity is New Network Entity (e.g., Interworking Entity (IWE) or ANDSF)

Figure 14:
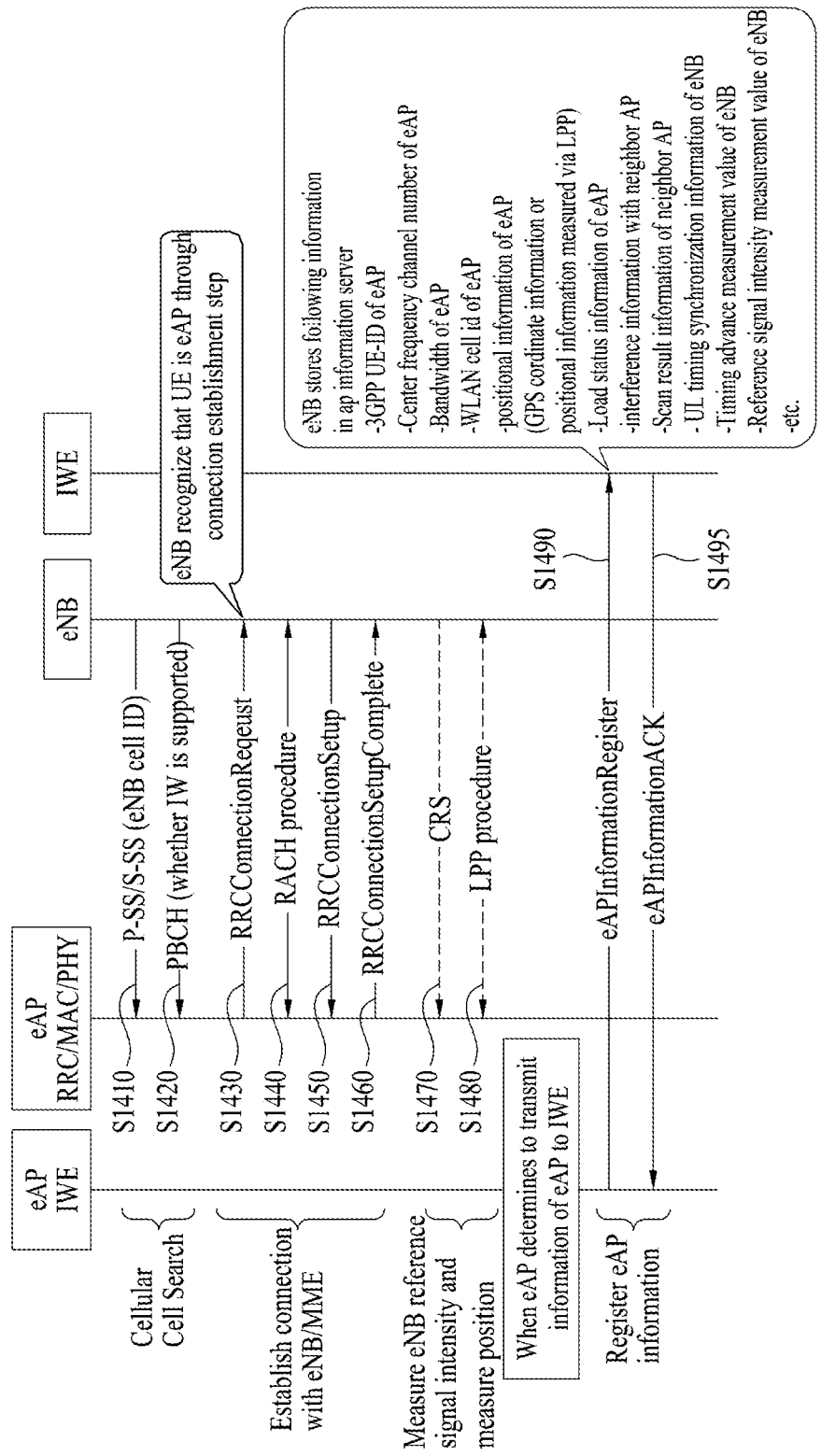
FIG. 14 is a diagram for explanation of an eAP information transmitting procedure when an AP information control entity is a new network entity (hereinafter, referred to as an IWE)

FIG. 14 is a diagram for explanation of an eAP information transmitting procedure when an AP information control entity is a new network entity (hereinafter, referred to as an IWE).

eAP Initial Connection Establishment Procedure

A condition for triggering the eAP initial connection establishment procedure corresponds to cases in which 1) the eAP is powered on, 2) the eAP is moved to new cellular coverage, and 3) cellular-WiFi converged scenario is determined to be applied to UE(s) in a cellular system.

For cell search by eAP, the eAP may receive a primary synch signal (P-SS) and a secondary synch signal (S-SS) to acquire a physical cell ID of the eNB (S1410). As a method for checking whether an eNB supports interworking, the eAP may check whether interworking is supported, from information (e.g., whether interworking is supported is indicated with 1 bit size) of a system information block (SIB) received from the eNB or a master information block (MIB) in a physical broadcasting channel (PBCH) (S1420). Alternatively, the eNB may newly define SIB-n for WiFi-cellular interworking control information, and when new SIB-n is defined, the eAP may recognize whether the eNB supports interworking according to whether scheduling SIB-n is present through SIB-1 received from the eNB. The eAP may identify a physical cell ID of a cellular eNB for supporting interworking between a wireless LAN and a cellular network through cell search.

Perform connection establishment with MME/eNB (connection establishment according to attach or service request)

The eAP transmits an RRCConnectionReqeust message to the eNB through NAS ATTACH REQUEST like a legacy LTE UE (S1430). With regard to establishment of the NAS signaling connection, an EPS attach type may be defined as a new type indicating attachment to the eAP and establishmentCause may be defined as a parameter indicating connection establishment of the eAP such as "eAP originating Access". Alternatively, the eAP may transmit an ID indicating that a UE-Identity is an eAP (e.g., reserved ID allocation).

The eAP may perform a random access procedure (RACH) with the eNB (S1440) and receive a RRC connection setup message (e.g., RRCConnectionSetup message) from the eNB (S1450). After RRC connection establishment is completed, the eAP may transmit a message indicating RRC connection establishment complete (RRCConnectionSetupComplete message) to the eNB (S1460).

The eAP may receive a cell-specific reference signal (CRS) from the eNB and measure reference signal intensity of the eNB (S1470). Alternatively, the eAP may measure a position of the eAP via an LTE positioning protocol (LPP) procedure according to the GPS or 3GPP TS 36.355 standard (S1480).

eAP Information Registration Procedure

A RRC/MAC/PHY layer of the eAP needs to transmit information associated with interworking to an interworking protocol layer. The eAP may transmit information of the eAP to an IWE through connection established with the eNB (transmitted as an upper layer message) (S1490). The eAP may transmit a message (e.g., eAPInformationResgister message) including information of the eAP and eNB related measurement information to the IWE (S1490). The eAPInformationResgister message may be transmitted and may include at least one of an ID (or a UE-ID) of an eAP in a 3GPP network of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB. The IWE that receives the eAPInformationResgister message may store corresponding information as a database (DB) in a server of the IWE and transmit an acknowledgement message (e.g., eAPInformationACK message) indicating that information is successfully stored, to the eAP (S1495).

Figure 15:
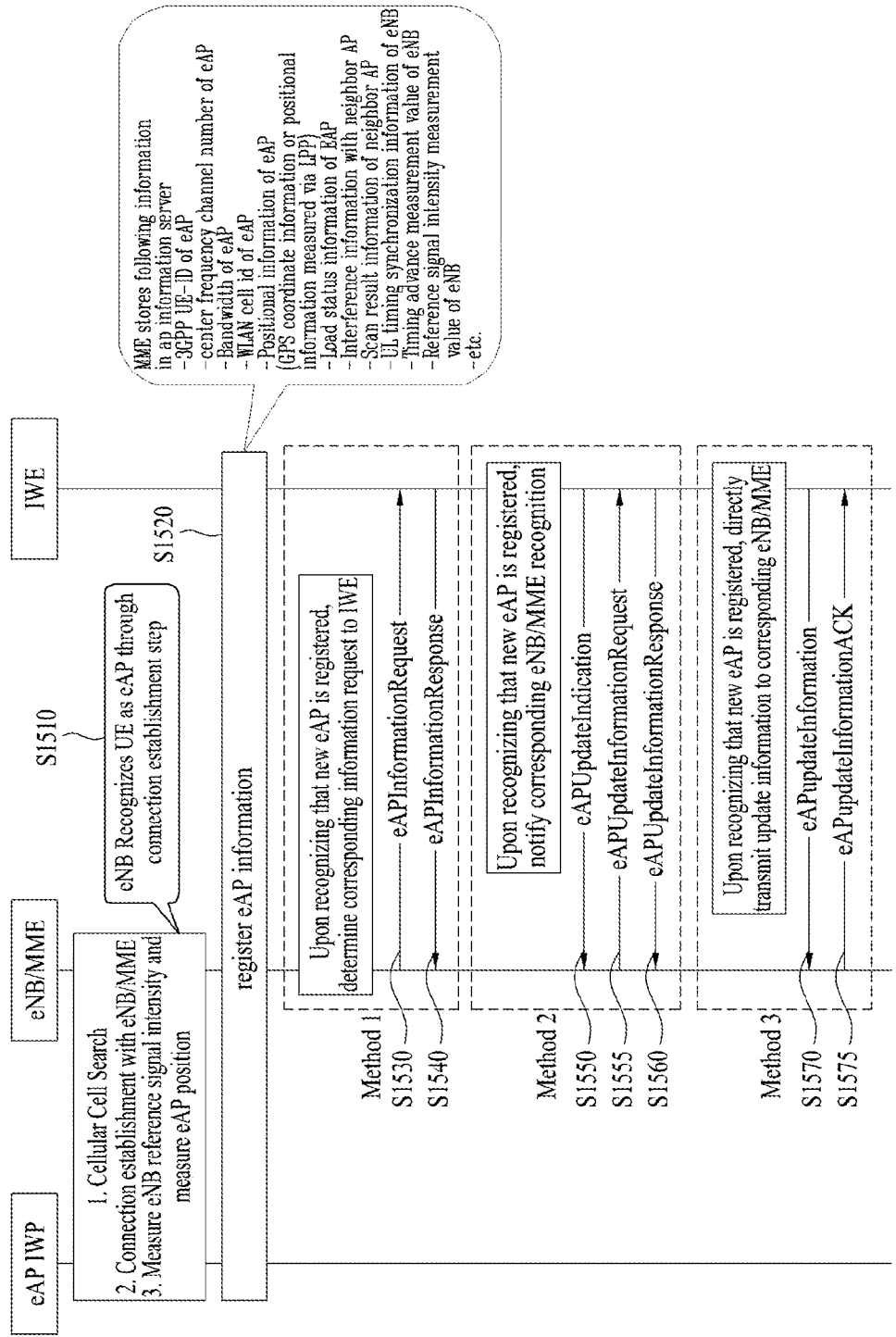
FIG. 15 is a diagram for explanation of a procedure between eNB/MME and an IWE when an AP information control entity is an IWE.

FIG. 15 is a diagram for explanation of a procedure between eNB/MME and an IWE when an AP information control entity is an IWE.

eAP Initial Connection Establishment Procedure

Through connection establishment between the eAP and the eNB/MME, the eNB may be recognized as the eAP (S1510). Then the IWE registers information of the eAP (S1120). The IWE stores, in an AP information server, at least one of an ID (or UE-ID) of the IWE in a 3GPP network of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of neighbor AP(s), UL timing synchronization information of the eNB, a timing advance measurement value of the eNB, and a reference signal intensity measurement value of the eNB.

The IWE may consider a newly registered eAP as a WLAN region that belongs to the corresponding eNB based on eNB information transmitted by the eAP and transmit the corresponding information to an eNB or MME that performs interworking, using an upper layer message. In this case, an interworking (IW) protocol configured between the IWE and the eAP/MME needs also to be supported in the eNB/MME. Hereinafter, the present invention will be described in terms of methods 1, 2, and 3 below.

Method 1:

When eAP/MME recognizes that a new eAP is registered, the eAP/MME may transmit a message (e.g., an eAPInformationRequest message) for requesting corresponding information to the IWE (S1530). The eNB/MME may request eAP within coverage of the eNB/MME to the IWE using the same protocol as that used between the eAP and the IWE. The eAPInformationRequest message may include the requested information of the eNB/MME. In response to the eAPInformationRequest message, the IWE may transmit a message (e.g., an eAPInformationResponse message)

including information about a new eAP to the eAP/MME (S1540). Information transmitted to the eAPInformationregister message may be entirely or partially transmitted to the eAPInformationResponse message.

Method 2:

When a new eAP is updated to a specific eNB/MME region, the IWE may transmit a message (e.g., an eAPUpdateIndication message) indicating that new information is updated to the corresponding eNB or MME using the same protocol as that used between the eAP and the IWE (S1550). The eNB or the MME transmits a message (e.g., an eAPUpdateInformationRequest message) for requesting the updated eAP information, to the IWE (S1155). The IWE that receives the eAPUpdateInformationRequest message may transmit a message (e.g., an eAPupdateInformationResponse message) including updated information of the corresponding eAP (S1560).

Method 3:

When a new eAP is updated in a specific eNB/MME region, the IWE may transmit a message including updated information to the corresponding eNB or MME using the same protocol as that used between the eAP and the IWE. When new eAP information is updated to a server of the IWE, the updated eAP information may be transmitted to the eNB/MME to which the corresponding eAP belongs through eAPUpdateInformation (S1570) and the eNB/MME that receives the eAPUpdateInformation may transmit an eAPupdateInformationACK message indicating that successful reception (S1575). Any one the aforementioned methods 1 to 3 may be selectively performed.

Figure 16:
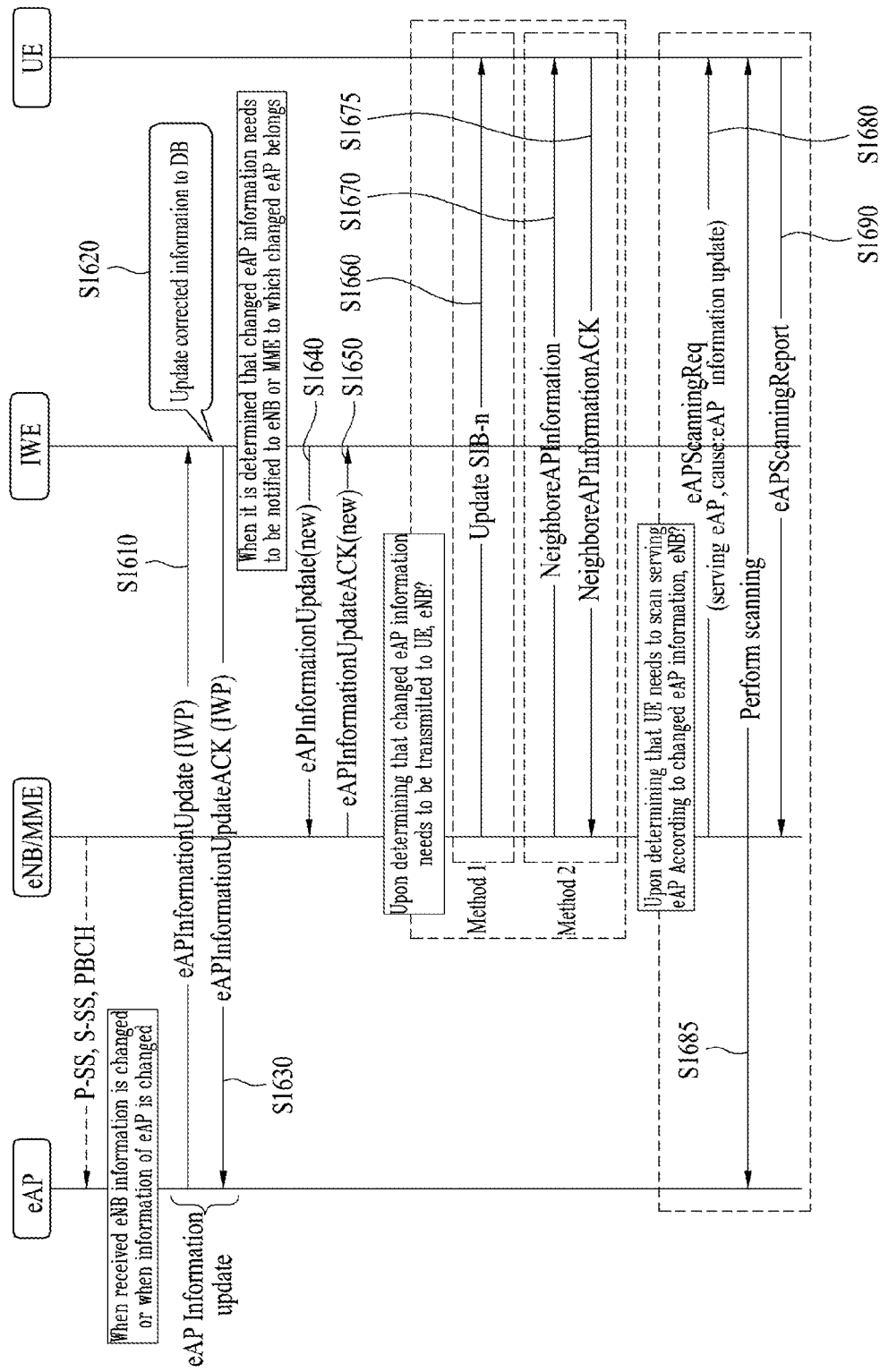
FIG. 16 is a diagram for explanation of a procedure for updating AP information when an AP information control entity is an IWE.

FIG. 16 is a diagram for explanation of a procedure for updating AP information when an AP information control entity is an IWE.

The procedure of FIG. 16 is performed when AP information needs to be updated after the AP information is registered, as described with reference to FIG. 15. The eAP may trigger eAP information update when one of eAP information items (e.g., location information, load status, interference information with neighbor AP(s), etc.) is changed or information of the eNB to which the eAP belongs (for example, when the eNB is changed due to movement of the eAP or when eNB information received from the eNB is changed (e.g., signal intensity, uplink timing synchronization information, timing advance value, etc. are changed)). When the eAP information update is triggered, the eAP may transmit update information of the eAP to the MME via connection established with the MME (S1610). That is, when information of the eAP is corrected or eNB related measurement information is changed, the eAP may transmit a message (e.g., an eAPInformationUpdate message) including the update information to the MME (S1610).

The eAPInformationUpdate message may be transmitted and may include information that is corrected or changed from information such as a 3GPP UE-ID of the eAP, a center frequency channel number (in the case of one or more channels, the number of one or more channels is transmitted) of the eAP, a bandwidth of the eAP, an ID of a WLAN cell of the eAP (e.g., BSSID and SSID), location information of the eAP (GPS coordinate information or location information measured via LPP), load status information of the eAP, interference information with neighbor AP(s), scan result information of the neighbor AP(s), UL timing synchronization information of the eNB, a timing advance measurement value of the eNB, and a reference signal intensity measurement value of the eNB.

Then the IWE updates the received corrected information to a DB and stores the information (S1620). In addition, the IWE transmits a message (e.g., an eAPInformationUpdateACK message) indicating that the update information is appropriately stored) to the eAP (S1630).

When the eAP information is updated and the changed or updated eAP information needs to be transmitted to an eNB to which an eAP with updated information belongs, the IWE may notify the changed or updated eAP information to the corresponding eNB/MME through a message (e.g., eAPInformationUpdate (new)) (S1640). The eNB/MME that receives the eAPInformationUpdate (new) message may transmit a message (e.g., eAPInformationUpdateACK (new)) for acknowledgement to the IWE (S1650).

When the eAP information is updated and the changed or updated eAP information needs to be transmitted to a UE that is communicating with the eAP with updated information, the eNB/MME may notify the corresponding UE of the changed or updated eAP information using the following method.

In this case, as method 1, the eNB may transmit the updated eAP information to the corresponding UE using a broadcast method (S1660). The eNB needs to periodically broadcast eAP related information for a dual mode UE. An example of an RRC message for transmission of neighbor eAP information may include an SIB-n. As method 2, the updated eAP information may be transmitted using a unicast method (S1670). The eNB/MME may transmit the eAP related information to only a UE that needs to be connected to the eAP as a unicast message for the dual mode UE. An RRC message for transmission of neighbor eAP information may be defined and may include, for example, a neighboreAPInformation message. In response to transmission of the neighboreAPInformation message, the UE may transmit an acknowledgement message (e.g., a neighboreAPInformationAck message) indicating that the neighboreAPInformation message is appropriately checked, to the eNB/MME (S1675).

When the UE needs to scan a serving eAP according to the updated eAP information, the eNB/MME may transmit a message (e.g., an eAPScanningReq message) indicating (or requesting) eAP scanning During transmission of the scanning request message, the eNB may add information indicating "eAP Information Update" and serving eAP information to a cause field and transmit the information (S1680).

The UE that receives the eAPScanningReq message performs eAP scanning (S1685). In addition, the UE may transmit a message (e.g., an eAPScanningReport message) that reports the scanning result to the eNB/MME (S1690).

FIG. 17 is another diagram for explanation of a procedure for updating AP information when an AP information control entity is an IWE.

In FIG. 16, when eAP information is updated and the changed or updated eAP information needs to be transmitted to a UE that is communicating with the eAP with updated information, the IWE transmits an eAPInformationUpdate message to the eNB through an S1 interface in order to notify the corresponding UE of the changed or updated eAP information. In FIG. 17 distinguished from FIG. 16, an update method through an RRC message will be described.

An eAP may trigger eAP information update when one of eAP information items (e.g., location information, load status, interference information with neighbor AP(s), etc.) is changed or information of the eNB to which the eAP belongs (for example, when the eNB is changed due to movement of the eAP or when eNB information received from the eNB is changed (e.g., signal intensity, uplink timing synchronization information, timing advance value, etc. are changed)). When the eAP information update is triggered, an eAP IWP layer may transmit update information of the eAP IWP layer to an eAP RRC/NAS layer through an eAPInformation Update (IWP) message (S1710). The eAP RRC/NAS may generate an eAPInformationUpdate NAS/RRC message in the corresponding message and transmit the eAPInformationUpdate NAS/RRC message to the eNB/MME (S1720). Information may include the same information as the IWP message.

The eNB/MME that receives the eAPInformationUpdate NAS/RRC message uses the corresponding information for eAP information control of the eNB/MME and transmits the IWP message (eAPInformationUpdate (IWP)) to the MME (S1730). In addition, in response to the eAPInformationUpdate RRC/NAS message, the eNB/MME may transmit an eAPInformationUpdateACK RRC/NAS message to the eAP RRC/NAS layer (S1740). In response to reception of the eAPInformationUpdate (IWP) message, the IWE may transmit an acknowledgement message (e.g., an eAPInformationUpdateACK (IWP) message) to the eAP IWP layer (S1750). Subsequent procedures to operation S1760 of FIG. 17 are the same as the subsequent procedures to operation S1660 of FIG. 16, and thus a detailed description thereof will be omitted and will be understood with reference to FIG. 16.

As described above, when a cellular network proposed according to the present invention controls information of AP, it is advantageous that a UE can effectively use WLAN via control of a cellular network in a broadband wireless communication system using a method for effectively updating AP information by an AP information control entity, an eNB or a UE.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for updating base station information by a base station of a first communication system in a converged network for supporting a plurality of communication systems, the method comprising:
when information associated with a base station of a second communication system is changed or information associated with the base station of the first communication system is changed, receiving a first message comprising the changed information, from the base station of the second communication system, an RRC connection setup being completed between the base station of the first communication system and the base station of the second communication system;
updating the changed information based on the first message;
transmitting the changed information to a user equipment;
transmitting a second message for a scanning request to the user equipment;
wherein the second message comprises a reason for the scanning request and information indicating the base station of the second communication system, the reason indicating the information of the base station of the second communication system is updated; and
receiving a third message comprising a corresponding scanning result from the user equipment,
wherein the first communication system and the second communication system each use a different radio access technology (RAT).

2. The method according to claim 1, wherein, when the information associated with the base station of the second communication system is changed, the first message comprises at least a changed identifier (ID) of the base station of the second communication system, a changed center frequency channel number, a changed bandwidth, a changed cell ID, changed location information, changed load status information, changed interference information between the base station of the second communication system and a neighbor access point (AP), or changed scanning result information of the neighbor AP.

3. The method according to claim 1, wherein, when the information associated with the base station of the first communication system is changed, the first message comprises at least changed uplink timing synchronization information of the base station of the first communication system, a changed timing advance measurement value, or a changed reference signal intensity measurement value.

4. The method according to claim 1, wherein:
a case in which the information associated with the base station of the first communication system is changed comprises a case in which the base station of the first communication system is changed to another base station of the first communication system; and
the first message comprises information of another base station of the first communication system.

5. The method according to claim 1, wherein the first communication system is a cellular communication system and the second communication system is a wireless LAN system.

6. A method for updating base station information by a user equipment in a converged network for supporting a plurality of communication systems, the method comprising:
when information associated with a base station of a second communication system is changed, receiving a first message comprising the changed information associated with the base station of the second communication system, from a base station of a first communication system, an RRC connection setup being completed between the base station of the first communication system and the base station of the second communication system;
updating the information associated with the base station of the second communication system based on the first message;

receiving a second message for a scanning request from the base station of the first communication system;

wherein the second message comprises a reason for the scanning request and information indicating the base station of the second communication system, the reason indicating the information of the base station of the second communication system is updated;

scanning the base station of the second communication system; and transmitting a third message comprising a corresponding scanning result to the base station of the first communication system, wherein the first communication system and the second communication system each use a different radio access technology (RAT).

7. The method according to claim 6, wherein the first message comprises at least a changed identifier (ID) of the base station of the second communication system, a changed center frequency channel number, a changed bandwidth, a changed cell ID, changed location information, changed load status information, changed interference information between the base station of the second communication system and a neighbor access point (AP), or changed scanning result information of the neighbor AP.

8. The method according to claim 6, wherein the first communication system is a cellular communication system and the second communication system is a wireless LAN system.

9. A base station of a first communication system for updating base station information in a converged network for supporting a plurality of communication systems, the base station comprising:

a receiver configured to, when information associated with a base station of a second communication system is changed or information associated with the base station of the first communication system is changed, receive a first message comprising the changed information, from the base station of the second communication system, an RRC connection setup being completed between the base station of the first communication system and the base station of the second communication system;

a processor configured to update the changed information based on the first message; and a transmitter configured to:
transmit the changed information to a user equipment; and transmit a second message for a scanning request to the user equipment;

wherein the second message comprises a reason for the scanning request and information indicating the base station of the second communication system, the reason indicating the information of the base station of the second communication system is updated;

wherein the receiver is further configured to receive a third message comprising a corresponding scanning result from the user equipment, and wherein the first communication system and the second communication system each use a different radio access technology (RAT).

10. A user equipment for updating base station information in a converged network for supporting a plurality of communication systems, the user equipment comprising:

a receiver configured to, when information associated with a base station of a second communication system, receive a first message comprising information associated with the base station of the second communication, from a base station of a first communication system, a radio resource control, RRC, connection setup is completed between the base station of the first communication system and the base station of the second communication system;

a processor configured to update the information associated with the base station of the second communication system based on the first message, wherein the receiver is further configured to receive a second message for a scanning request from the base station of the first communication system;

wherein the second message comprises a reason for the scanning request and information indicating the base station of the second communication system, the reason indicating the information of the base station of the second communication system is updated;

wherein the processor is further configured to scan the base station of the second communication system; and a transmitter configured to transmit a third message comprising a corresponding scanning result to the base station of the first communication system, and wherein the first communication system and the second communication system each use a different radio access technology (RAT).

* * * * *